US008493014B2

(12) United States Patent
Henderson et al.

(10) Patent No.: US 8,493,014 B2
(45) Date of Patent: Jul. 23, 2013

(54) CONTROLLER AND METHOD FOR ESTIMATING, MANAGING, AND DIAGNOSING MOTOR PARAMETERS

(75) Inventors: Michael I. Henderson, Leeds (GB); Joseph G. Marcinkiewicz, St. Peters, MO (US); Charles E. Green, Fenton, MO (US)

(73) Assignee: Emerson Climate Technologies, Inc., Sidney, OH (US)

( * ) Notice: Subject to any disclaimer, the term of this patent is extended or adjusted under 35 U.S.C. 154(b) by 502 days.

(21) Appl. No.: 12/852,961

(22) Filed: Aug. 9, 2010

(65) Prior Publication Data
US 2011/0031920 A1 Feb. 10, 2011

Related U.S. Application Data

(60) Provisional application No. 61/232,640, filed on Aug. 10, 2009.

(51) Int. Cl.
*H02P 7/00* (2006.01)

(52) U.S. Cl.
USPC ........ 318/432; 318/400.22; 318/498; 318/812

(58) Field of Classification Search
USPC ............................. 318/432, 400.22, 798, 812
See application file for complete search history.

(56) References Cited

U.S. PATENT DOCUMENTS

| 4,364,237 A | 12/1982 | Cooper et al. |
| 4,370,564 A | 1/1983 | Matsushita |
| 4,428,016 A | 1/1984 | Brasfield |
| 4,662,185 A | 5/1987 | Kobayashi et al. |
| 4,866,588 A | 9/1989 | Rene |
| 4,940,929 A | 7/1990 | Williams |
| 5,064,356 A | 11/1991 | Horn |
| 5,224,025 A | 6/1993 | Divan et al. |
| 5,320,506 A | 6/1994 | Fogt |
| 5,359,281 A | 10/1994 | Barrow et al. |
| 5,371,666 A | 12/1994 | Miller |

(Continued)

FOREIGN PATENT DOCUMENTS

| EP | 2276157 A1 | 1/2011 |
| EP | 2381568 A2 | 10/2011 |

(Continued)

OTHER PUBLICATIONS

International Search Report regarding Application No. PCT/US2010/044982, mailed Feb. 23, 2011.

(Continued)

*Primary Examiner* — Erick Glass
(74) *Attorney, Agent, or Firm* — Harness, Dickey & Pierce, P.L.C.

(57) ABSTRACT

A motor control system includes a control module, a switching module, and a filtering module. The control module determines output voltages for operating a motor based on a torque demand. The switching module generates switching signals for an inverter that drives the motor. The switching module generates the switching signals based on the output voltages. The switching module generates an out-of-volts (OOV) signal according to a comparison based on the output voltages, a maximum duty cycle, and a voltage of a direct current (DC) bus that provides power to the inverter. The filtering module generates an OOV amount by filtering the OOV signal. The control module selectively limits the torque demand based on the OOV amount.

20 Claims, 13 Drawing Sheets

U.S. PATENT DOCUMENTS

| | | | |
|---|---|---|---|
| 5,383,109 A | 1/1995 | Maksimovic et al. | |
| 5,457,375 A | 10/1995 | Marcinkiewicz et al. | |
| 5,461,263 A | 10/1995 | Helfrich | |
| 5,483,136 A | 1/1996 | Marcinkiewicz | |
| 5,502,630 A | 3/1996 | Rokhvarg | |
| 5,565,752 A | 10/1996 | Jansen et al. | |
| 5,605,053 A | 2/1997 | Otori | |
| 5,656,915 A | 8/1997 | Eaves | |
| 5,682,306 A | 10/1997 | Jansen | |
| 5,742,151 A | 4/1998 | Hwang | |
| 5,801,935 A | 9/1998 | Sugden et al. | |
| 5,867,379 A | 2/1999 | Maksimovic et al. | |
| 5,917,864 A | 6/1999 | Asahara | |
| 5,977,660 A | 11/1999 | Mandalakas et al. | |
| 6,026,006 A | 2/2000 | Jiang et al. | |
| 6,091,215 A | 7/2000 | Lovett et al. | |
| 6,109,048 A | 8/2000 | Kim | |
| 6,181,120 B1 | 1/2001 | Hawkes et al. | |
| 6,225,767 B1 | 5/2001 | Lovett et al. | |
| 6,256,213 B1 | 7/2001 | Illingworth | |
| 6,326,750 B1 | 12/2001 | Marcinkiewicz | |
| 6,366,070 B1 | 4/2002 | Cooke et al. | |
| 6,373,734 B1 | 4/2002 | Martinelli | |
| 6,388,905 B2 | 5/2002 | Nakagawa | |
| 6,396,229 B1 | 5/2002 | Sakamoto et al. | |
| 6,404,154 B2 | 6/2002 | Marcinkiewicz et al. | |
| 6,411,065 B1 | 6/2002 | Underwood et al. | |
| 6,441,580 B2 | 8/2002 | Marcinkiewicz | |
| 6,501,240 B2 | 12/2002 | Ueda et al. | |
| 6,594,158 B2 | 7/2003 | Batarseh et al. | |
| 6,639,377 B2 | 10/2003 | Iwaji et al. | |
| 6,657,877 B2 | 12/2003 | Kashima et al. | |
| 6,731,083 B2 | 5/2004 | Marcinkiewicz | |
| 6,756,757 B2 | 6/2004 | Marcinkiewicz et al. | |
| 6,757,185 B2 | 6/2004 | Rojas Romero | |
| 6,771,522 B2 | 8/2004 | Hayashi et al. | |
| 6,828,751 B2 | 12/2004 | Sadasivam et al. | |
| 6,912,142 B2 | 6/2005 | Keim et al. | |
| 6,927,553 B2 | 8/2005 | Chen | |
| 6,947,504 B1 | 9/2005 | Pettit | |
| 7,061,212 B2 | 6/2006 | Phadke | |
| 7,068,016 B2 | 6/2006 | Athari | |
| 7,088,081 B2 | 8/2006 | Takahashi et al. | |
| 7,088,881 B2 | 8/2006 | Nir | |
| 7,148,664 B2 | 12/2006 | Takahashi et al. | |
| 7,151,359 B2 | 12/2006 | Randall et al. | |
| 7,164,590 B2 | 1/2007 | Li et al. | |
| 7,176,644 B2 | 2/2007 | Ueda et al. | |
| 7,193,388 B1 | 3/2007 | Skinner et al. | |
| 7,208,895 B2 | 4/2007 | Marcinkiewicz et al. | |
| 7,295,452 B1 | 11/2007 | Liu | |
| 7,342,379 B2 | 3/2008 | Marcinkiewicz et al. | |
| 7,352,151 B2 | 4/2008 | Fujitsuna et al. | |
| 7,359,224 B2 | 4/2008 | Li | |
| 7,375,485 B2 | 5/2008 | Shahi et al. | |
| 7,403,404 B2 | 7/2008 | Oka et al. | |
| 7,459,874 B2 * | 12/2008 | Bae et al. | 318/623 |
| 7,495,410 B2 | 2/2009 | Zargari et al. | |
| 7,583,049 B2 | 9/2009 | Marcinkiewicz et al. | |
| 7,591,038 B2 | 9/2009 | Murray et al. | |
| 7,615,891 B2 | 11/2009 | Wu et al. | |
| 7,626,349 B2 | 12/2009 | Marcinkiewicz et al. | |
| 7,638,967 B2 | 12/2009 | Aizawa et al. | |
| 7,667,423 B2 | 2/2010 | Shahi et al. | |
| 7,683,568 B2 | 3/2010 | Pande et al. | |
| 7,694,538 B2 | 4/2010 | Thorn et al. | |
| 7,733,044 B2 | 6/2010 | Nakamura et al. | |
| 7,834,573 B2 * | 11/2010 | Lindsey et al. | 318/490 |
| 7,888,881 B2 | 2/2011 | Shteynberg et al. | |
| 7,905,122 B2 | 3/2011 | Murray et al. | |
| 7,908,893 B2 | 3/2011 | Thorn et al. | |
| 7,969,125 B2 | 6/2011 | Melanson | |
| 8,264,619 B2 * | 9/2012 | Lowe | 348/734 |
| 2002/0145837 A1 * | 10/2002 | Krefta et al. | 361/23 |
| 2002/0149953 A1 | 10/2002 | Smedley et al. | |
| 2003/0052640 A1 | 3/2003 | Iwaji et al. | |
| 2003/0057912 A1 | 3/2003 | Iwaji et al. | |
| 2003/0218444 A1 | 11/2003 | Marcinkiewicz et al. | |
| 2004/0211009 A1 | 10/2004 | Murray et al. | |
| 2004/0239296 A1 | 12/2004 | Turchi | |
| 2004/0257028 A1 | 12/2004 | Schulz et al. | |
| 2005/0046370 A1 | 3/2005 | Gallegos-Lopez et al. | |
| 2005/0187752 A1 | 8/2005 | Colby et al. | |
| 2005/0204482 A1 | 9/2005 | Murray et al. | |
| 2006/0013024 A1 | 1/2006 | Temesi et al. | |
| 2006/0097688 A1 | 5/2006 | Patel et al. | |
| 2006/0125427 A1 | 6/2006 | Kishibe et al. | |
| 2006/0130504 A1 | 6/2006 | Agrawal et al. | |
| 2006/0290302 A1 | 12/2006 | Marcinkiewicz et al. | |
| 2006/0290304 A1 | 12/2006 | Marcinkiewicz et al. | |
| 2007/0120519 A1 | 5/2007 | Sakamoto et al. | |
| 2007/0170880 A1 | 7/2007 | Shahi et al. | |
| 2008/0002444 A1 | 1/2008 | Shekhawat et al. | |
| 2008/0031021 A1 | 2/2008 | Ros et al. | |
| 2008/0143289 A1 | 6/2008 | Marcinkiewicz et al. | |
| 2008/0185986 A1 | 8/2008 | Marcinkiewicz et al. | |
| 2008/0246445 A1 | 10/2008 | Wrathall | |
| 2008/0278101 A1 | 11/2008 | Shahi et al. | |
| 2008/0284401 A1 | 11/2008 | Oettinger et al. | |
| 2008/0304189 A1 * | 12/2008 | Tang et al. | 361/33 |
| 2008/0310200 A1 | 12/2008 | Maksimovic et al. | |
| 2009/0021208 A1 | 1/2009 | Romenesko et al. | |
| 2009/0122582 A1 | 5/2009 | Ye et al. | |
| 2009/0153113 A1 | 6/2009 | Zilberberg | |
| 2009/0174262 A1 | 7/2009 | Martin et al. | |
| 2009/0243561 A1 | 10/2009 | Tan et al. | |
| 2009/0303764 A1 | 12/2009 | Jin et al. | |
| 2010/0080026 A1 | 4/2010 | Zhang | |
| 2010/0246228 A1 | 9/2010 | Kazlauskas | |
| 2010/0292943 A1 | 11/2010 | Minor et al. | |
| 2011/0031943 A1 | 2/2011 | Green | |
| 2011/0075462 A1 | 3/2011 | Wildash | |
| 2011/0127938 A1 | 6/2011 | Kawakami et al. | |
| 2011/0156619 A1 | 6/2011 | Nomura | |
| 2011/0175560 A1 | 7/2011 | Akiyama | |

FOREIGN PATENT DOCUMENTS

| | | | |
|---|---|---|---|
| JP | 08249067 A | 9/1996 | |
| JP | 09062363 A | 3/1997 | |
| JP | 09308283 A | 11/1997 | |
| JP | 2000044135 A | 2/2000 | |
| JP | 2002199780 A | 7/2002 | |
| JP | 2003018704 A | 1/2003 | |
| JP | 2004112942 A | 4/2004 | |
| JP | 2007259686 A | 10/2007 | |
| KR | 19980080006 A | 6/2002 | |
| KR | 20060009199 A | 1/2006 | |
| KR | 20060129272 A | 12/2006 | |
| KR | 20070064726 A | 6/2007 | |
| KR | 20080060290 A | 7/2008 | |

OTHER PUBLICATIONS

Written Opinion of the International Searching Authority regarding Application No. PCT/US2010/044982, mailed Feb. 23, 2011.

"Real-Time Computer Control: An Introduction," Bennett, S., Prentice Hall International (UK) Ltd., Chapter 2 (pp. 19-47) and Chapter 4 (pp. 99-128), 1988.

International Search Report regarding Application No. PCT/US2010/045041, mailed Feb. 22, 2011.

Written Opinion of the International Searching Authority regarding Application No. PCT/US2010/045041, mailed Feb. 22, 2011.

Notice of Allowance and Fees Due regarding U.S. Appl. No. 12/852,625, dated Mar. 15, 2012.

International Search Report regarding Application No. PCT/US2010/045046, mailed Apr. 6, 2011.

Written Opinion of the International Searching Authority regarding Application No. PCT/US2010/045046, mailed Apr. 6, 2011.

International Seach Report regarding Application No. PCT/US2010/044991, mailed Apr. 22, 2011.

Written Opinion of the International Searching Authority regarding Application No. PCT/US2010/044991, mailed Apr. 22, 2011.

International Search Report regarding Application No. PCT/US2010/044993, mailed Apr. 25, 2011.

Written Opinion of the International Searching Authority regarding Application No. PCT/US2010/044993, mailed Apr. 25, 2011.

International Search Report regarding Application No. PCT/US2010/044998, Apr. 21, 2011.
Written Opinion of the International Searching Authority regarding Application No. PCT/US2010/044998, mailed Apr. 21, 2011.
Written Opinion of the International Searching Authority regarding Application No. PCT/US2010/045005, mailed Apr. 25, 2011.
International Search Report regarding Application No. PCT/US2010/045005, mailed Apr. 25, 2011.
Written Opinion of the International Searching Authority regarding Application No. PCT/US2010/045025, mailed Apr. 18, 2011.
International Search Report regarding Application No. PCT/US2010/045025, mailed Apr. 18, 2011.
International Search Report regarding Application No. PCT/US2010/045032, mailed Apr. 25, 2011.
Written Opinion of the International Searching Authority regarding Application No. PCT/US2010/045032, mailed Apr. 25, 2011.
"Power-Factor Correction with Interieved Boost Converters in Continuous-Inductor-Current Mode," Laszlo Balogh and Richard Redl, IEEE 1993.
"Advantages of Interleaved Boost Converters for PFC," Michael O'Loughlin, Texas Instruments, Mar. 30, 2006.
"2nd Generation of PFC Solutions," Michael Frisch, Temesi Erno, Yu Jinghui, Tyco Electronics/Power Systems, Sep. 2004.
Notice of Allowance and Fee(s) Due and Notice of Allowability regarding U.S. Appl. No. 12/852,549, dated Apr. 2, 2012.
Notice of Allowance regarding U.S. Appl. No. 12/852,585, dated Aug. 28, 2012.
Notice of Allowance and Fee(s) Due regarding U.S. Appl. No. 12/852,553, dated Sep. 21, 2012.
Office Action regarding U.S. Appl. No. 12/852,565, dated Oct. 15, 2012.
Baggio, J.E., et al., "Discrete control for three-level boost PFC converter," Telecommunications Energy Conference, 2002. INTELEC. 24th Annual International, pp. 627-633,2002. doi: 10.1109/INTLEC.2002.1048772; URL: http://ieeexplore.ieee.org/stamp/stamp.jsp?tp=&arnumber=1048722&isnumber=22440.
Notice of Allowance and Fee(s) Due regarding U.S. Appl. No. 12/852,578, dated Nov. 23, 2012.
Non-Final Office Action regarding U.S. Appl. No. 12/852,557, dated Jan. 3, 2013.
Laszlo Huber et al. "Performance Evaluation of Bridgeless PFC Boost Rectifiers." Delta Products Corporation. Power Electronics Laboratory. Applied Power Electronics Conference. APEC 2007—Twenty Second Annual IEEE, IEEE, PI. Feb. 1, 2007. pp. 165-171.
Extended European Search Report regarding Application No. 10808617.4-1242 / 2465187, dated Jan. 30, 2013.
Notice of Grounds for Rejection regarding Korean Patent Application No. 10-2012-7006210, dated Mar. 22, 2013. Translation provided by Y.S. Chang & Associates.

* cited by examiner

CONTROLLER AND METHOD FOR ESTIMATING, MANAGING, AND DIAGNOSING MOTOR PARAMETERS

CROSS-REFERENCE TO RELATED APPLICATIONS

This application claims the benefit of U.S. Provisional Application No. 61/232,640, filed on Aug. 10, 2009. The entire disclosure of the above application is incorporated herein by reference.

FIELD

The present disclosure relates to electric motor control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric motors are used in a wide variety of industrial and residential applications including, but not limited to, heating, ventilating, and air conditioning (HVAC) systems. For example only, an electric motor may drive a compressor in an HVAC system. One or more additional electric motors may also be implemented in the HVAC system. For example only, the HVAC system may include another electric motor that drives a fan associated with a condenser. Another electric motor may be included in the HVAC system to drive a fan associated with an evaporator.

Power factor is an indicator of the relationship between current and voltage in a circuit, or how effectively a circuit uses real power compared to storing and returning energy to the power source. Power factor may be expressed as a value between zero and one. The circuit's use of actual real power divided by the total volt amps drawn by the circuit may increase as the power factor approaches one. In various implementations, a power factor correction (PFC) system may be implemented. PFC systems generally operate to increase a circuit's power factor toward one, thereby increasing the circuit's use of real power as compared with the amount of reactive power the circuit stores and returns to the source.

SUMMARY

A motor control system includes a control module, a switching module, and a filtering module. The control module determines output voltages for operating a motor based on a torque demand. The switching module generates switching signals for an inverter that drives the motor. The switching module generates the switching signals based on the output voltages. The switching module generates an out-of-volts (OOV) signal according to a comparison based on the output voltages, a maximum duty cycle, and a voltage of a direct current (DC) bus that provides power to the inverter. The filtering module generates an OOV amount by filtering the OOV signal. The control module selectively limits the torque demand based on the OOV amount.

In other features, the motor control system further includes a speed control module. The speed control module generates the torque demand based on a commanded speed and selectively pauses increasing the torque demand based on the OOV amount.

In still other features, the speed control module pauses increasing the torque demand when the OOV amount is greater than a predetermined threshold.

In further features, the motor control system further includes a torque mapping module. The torque mapping module maps the torque demand to a current demand, selectively limits the current demand based on an upper current limit, and sets a limit signal while limiting the current demand. The speed control module pauses increasing the torque demand when the limit signal is set.

In still further features, the motor control system further includes a speed control module. The speed control module generates the torque demand based on a limited commanded speed and generates the limited commanded speed by subtracting a product of a predetermined gain and the OOV amount from a commanded speed.

In other features, the motor control system further includes a current control module. The current control module generates voltage commands based on the torque demand. The output voltages are calculated based on the voltage commands. The current control module selectively pauses increasing one of the voltage commands based on the OOV signal.

In still other features, the voltage commands include a q-axis voltage command and a d-axis voltage command. The current control module selectively pauses increasing only the q-axis voltage command based on the OOV signal.

In further features, the motor control system further includes a d-axis injection module. The d-axis injection module adjusts a d-axis current demand based on the OOV amount. The control module determines the output voltages based on a q-axis current demand and the d-axis current demand. The q-axis current demand is based on the torque demand.

In still further features, the switching module generates duty cycle values based on dividing the output voltages by the DC bus voltage and generates the OOV signal based on a comparison of the maximum duty cycle and a maximum difference between two of the duty cycle values.

In other features, the switching module generates the OOV signal based on a comparison of an available voltage and a maximum difference between two of the output voltages. The available voltage is equal to the DC bus voltage multiplied by the maximum duty cycle percentage.

A method includes: determining output voltages for operating a motor based on a torque demand; generating switching signals, based on the output voltages, for an inverter that drives the motor; generating an out-of-volts (OOV) signal according to a comparison based on the output voltages, a maximum duty cycle, and a voltage of a direct current (DC) bus that provides power to the inverter; generating an OOV amount by filtering the OOV signal; and selectively limiting the torque demand based on the OOV amount.

In other features, the method further includes generating the torque demand based on a commanded speed and pausing increasing the torque demand when the OOV amount is greater than a predetermined threshold.

In still other features, the method further includes mapping the torque demand to a current demand, selectively limiting the current demand based on an upper current limit, setting a limit signal while limiting the current demand, and pausing increasing the torque demand when the limit signal is set.

In further features, the method further includes generating a limited commanded speed by subtracting a product of a predetermined gain and the OOV amount from a commanded speed and generating the torque demand based on the limited commanded speed.

In still further features, the method further includes generating voltage commands based on the torque demand, wherein the output voltages are calculated based on the voltage commands, and selectively pausing increasing one of the voltage commands based on the OOV signal.

In other features, the voltage commands include a q-axis voltage command and a d-axis voltage command, and the method further includes selectively pausing increasing only the q-axis voltage command based on the OOV signal.

In still other features, the method further includes determining a q-axis current demand based on the torque demand, adjusting a d-axis current demand based on the OOV amount, and determining the output voltages based on the q-axis current demand and the d-axis current demand.

In further features, the method further includes generating duty cycle values based on dividing the output voltages by the DC bus voltage, and generating the OOV signal based on a comparison of the maximum duty cycle and a maximum difference between two of the duty cycle values.

In still further features, the method further includes determining an available voltage based on the DC bus voltage multiplied by the maximum duty cycle and generating the OOV signal based on a comparison of the available voltage and a maximum difference between two of the output voltages.

A method includes: generating a torque demand based on a commanded speed; mapping the torque demand to a q-axis current demand; selectively limiting the q-axis current demand based on an upper current limit and a d-axis current demand; setting a limit signal while limiting the q-axis current demand; generating a q-axis voltage command and a d-axis voltage command based on the q-axis current demand and the d-axis current demand, respectively; determining first, second, and third output voltages for operating first, second, and third windings, respectively, of a motor based on the voltage commands; determining first, second, and third duty cycle values based on dividing the first, second, and third output voltages, respectively, by a voltage of a direct current (DC) bus, wherein the DC bus provides power to an inverter that drives the motor; generating switching signals, based on the duty cycle values, for the inverter; setting an out-of-volts (OOV) signal to one when at least one of the duty cycle values is greater than a maximum duty cycle, and setting the OOV signal to zero otherwise; generating an OOV amount based on a weighted moving average of the OOV signal; pausing increasing the torque demand when the OOV amount is greater than a predetermined threshold; pausing increasing the torque demand when the limit signal is set; adjusting the d-axis current demand based on the OOV amount; and pausing increasing only the q-axis voltage command when the OOV signal is set to one.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
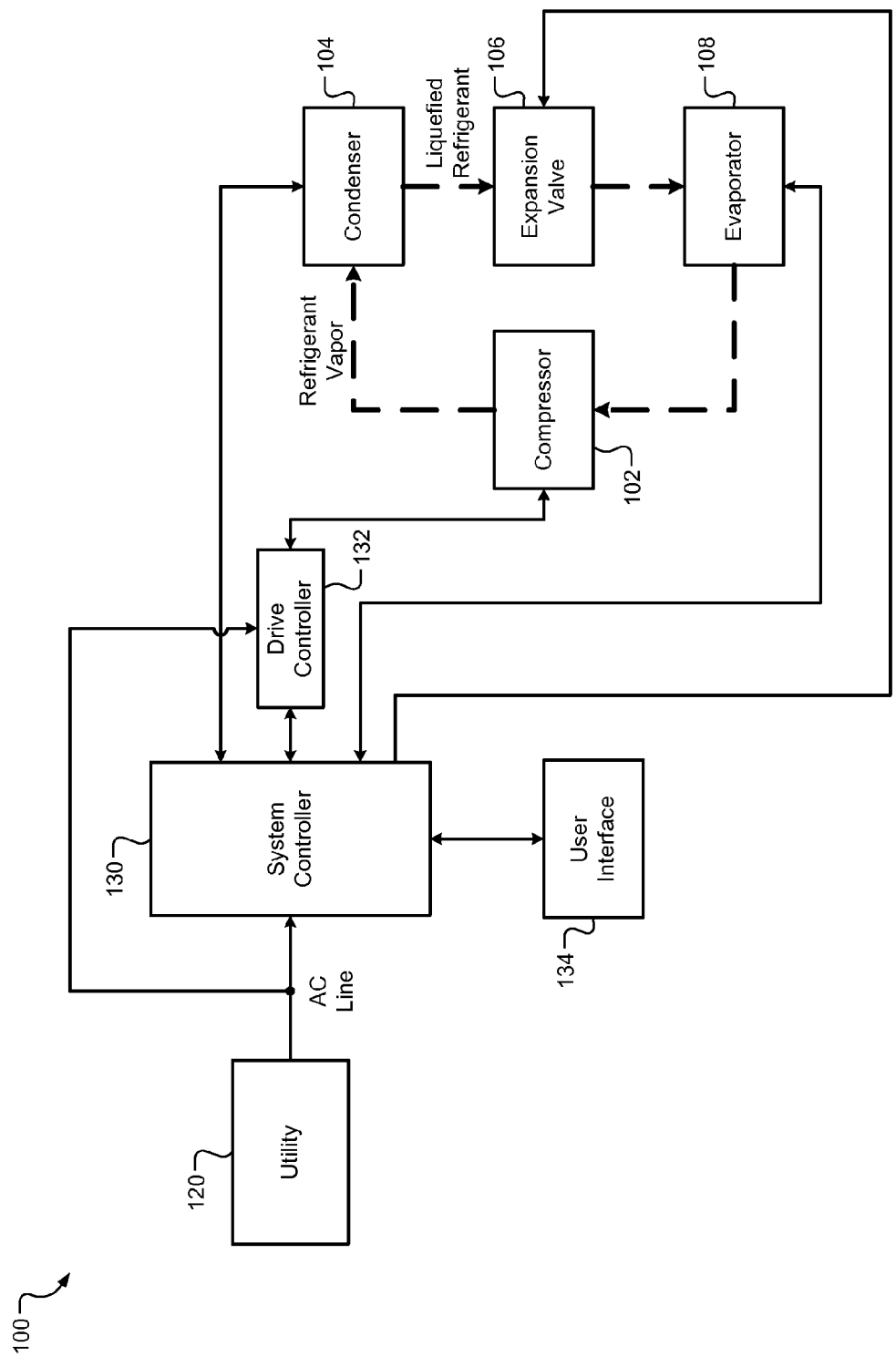
FIG. 1 is a functional block diagram of an example refrigeration system.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Referring now to FIG. 1, a functional block diagram of a refrigeration system 100 is presented. The refrigeration system 100 may include a compressor 102, a condenser 104, an expansion valve 106, and an evaporator 108. According to the principles of the present disclosure, the refrigeration system 100 may include additional and/or alternative components. In addition, the present disclosure is applicable to other types of refrigeration systems including, but not limited to, heating, ventilating, and air conditioning (HVAC), heat pump, refrigeration, and chiller systems.

The compressor 102 receives refrigerant in vapor form and compresses the refrigerant. The compressor 102 provides pressurized refrigerant in vapor form to the condenser 104. The compressor 102 includes an electric motor that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a system controller 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts (V) root mean squared (RMS) or at another suitable voltage. In various implementations, the utility 120 may provide three-phase power at approximately 400 Volts RMS or 480 Volts RMS at a line frequency of, for example, 50 or 60 Hz. The utility 120 may provide the AC power to the system controller 130 via an AC line. The AC power may also be provided to a drive controller 132 via the AC line.

The system controller 130 controls the refrigeration system 100. For example only, the system controller 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the system controller 130. The user interface 134 may additionally or alternatively provide the user inputs to the drive controller 132. The user inputs may include, for example, a desired temperature, requests regarding operation of a fan (e.g., the evaporator fan), and/or other suitable inputs. The system controller 130 may control operation of the fans of the condenser 104, the evaporator 108, and/or the expansion valve 106.

The drive controller 132 may control the compressor 102 based on commands from the system controller 130. For example only, the system controller 130 may instruct the drive controller 132 to operate the compressor motor at a certain speed. In various implementations, the drive controller 132 may also control the condenser fan.

Figure 2:
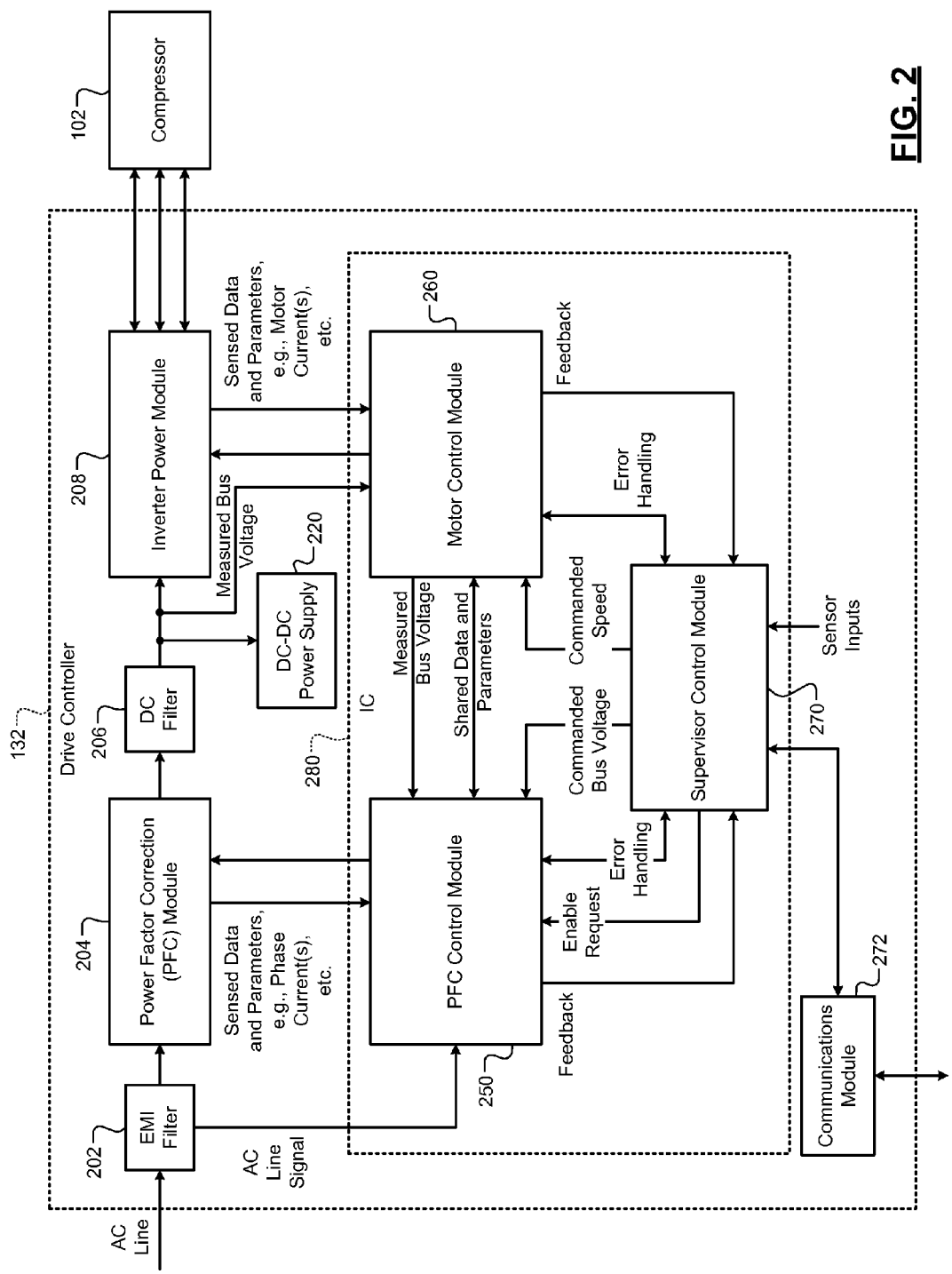
FIG. 2 is a functional block diagram of an example drive controller and an example compressor.

Referring now to FIG. 2, a functional block diagram of the drive controller 132 and the compressor 102 is presented. An electromagnetic interference (EMI) filter 202 reduces EMI that might otherwise be injected back onto the AC line by the drive controller 132. The EMI filter 202 may also filter EMI carried on the AC line.

A power factor correction (PFC) module 204 receives AC power from the AC line as filtered by the EMI filter 202. The PFC module 204 (described in more detail with reference to FIGS. 3a, 3b, and 3c) rectifies the AC power, thereby converting the AC input power into direct current (DC) power. The generated DC power is provided at positive and negative terminals of the PFC module 204. The PFC module 204 also selectively provides power factor correction between the input AC power and the generated DC power.

The PFC module 204 selectively boosts the AC power to a DC voltage that is greater than a peak voltage of the AC power. For example only, the PFC module 204 may operate in a passive mode, where the DC voltage generated is less than a peak voltage of the AC power. The PFC module 204 may also operate in an active mode, where the DC voltage generated is greater than the peak voltage of the AC power. A DC voltage that is greater than the peak voltage of the AC power may be referred to as a boosted DC voltage.

AC power having an RMS voltage of 230 V has a peak voltage of approximately 325 V (230 V multiplied by the square root of 2). For example only, when operating from AC power having an RMS voltage of 230 V, the PFC module 204 may generate boosted DC voltages between approximately 350 V and approximately 410 V. For example only, the lower limit of 350 V may be imposed to avoid unstable operating regimes of the PFC module 204. The limits may vary, such as with the actual AC input voltage value. In various implementations, the PFC module 204 may be able to achieve higher boosted DC voltages than 410 V. However, the upper limit may be imposed to improve long-term reliability of components that would experience greater stress at higher voltages, such as components in a DC filter 206. In various implementations, the upper and/or lower limits may be varied.

The DC filter 206 filters the DC power generated by the PFC module 204. The DC filter 206 minimizes ripple voltage present in the DC power that results from the conversion of AC power to DC power. In various implementations, the DC filter 206 may include one or more series or parallel filter capacitors connected between the positive and negative terminals of the PFC module 204. In such implementations, the positive and negative terminals of the PFC module 204 may be connected directly to positive and negative terminals of an inverter power module 208.

The inverter power module 208 (described in more detail with reference to FIGS. 4a, 4b, and 4c) converts the DC power, as filtered by the DC filter 206, into AC power that is provided to the compressor motor. For example only, the inverter power module 208 may convert the DC power into three-phase AC power and provide the phases of the AC power to three respective windings of the motor of the compressor 102. In other implementations, the inverter power module 208 may convert the DC power into more or fewer phases of power.

A DC-DC power supply 220 may also receive the filtered DC power. The DC-DC power supply 220 converts the DC power into one or more DC voltages that are suitable for various components and functions. For example only, the DC-DC power supply 220 may reduce the voltage of the DC power to a first DC voltage that is suitable for powering digital logic and a second DC voltage that is suitable for controlling switches within the PFC module 204. For example only, the second DC voltage may be selectively applied to gate terminals of the switches. In various implementations, DC power may be provided by another DC power source (not shown)—for example, a DC voltage derived via a transformer from the main 230 VAC input.

In various implementations, the first DC voltage may be approximately 3.3 V and the second DC voltage may be approximately 15 V. In various implementations, the DC-DC power supply 220 may also generate a third DC voltage. For example only, the third DC voltage may be approximately 1.2 V. The third DC voltage may be derived from the first DC voltage using a voltage regulator. For example only, the third DC voltage may be used for core digital logic and the first DC voltage may be used for input/output circuitry of a PFC control module 250 and a motor control module 260.

The PFC control module 250 controls the PFC module 204, and the motor control module 260 controls the inverter power module 208. In various implementations, the PFC control module 250 controls switching of the switches within the PFC module 204, and the motor control module 260 controls switching of switches within the inverter power module 208. The PFC module 204 may be implemented with 1, 2, 3, or more phases.

A supervisor control module 270 may communicate with the system controller 130 via a communications module 272. The communications module 272 may include an input/output port and other suitable components to serve as an interface between the system controller 130 and the supervisor control module 270. The communications module 272 may implement wired and/or wireless protocols.

The supervisor control module 270 provides various commands to the PFC control module 250 and the motor control module 260. For example, the supervisor control module 270 may provide a commanded speed to the motor control module 260. The commanded speed corresponds to a desired rotational speed of the motor of the compressor 102.

In various implementations, the commanded compressor speed may be provided to the supervisor control module 270 by the system controller 130. In various implementations, the supervisor control module 270 may determine or adjust the commanded compressor speed based on inputs provided via the communications module 272 and/or parameters measured by various sensors (i.e., sensor inputs). The supervisor control module 270 may also adjust the commanded compressor speed based on feedback from the PFC control module 250 and/or the motor control module 260.

The supervisor control module 270 may also provide other commands to the PFC control module 250 and/or the motor control module 260. For example, based on the commanded speed, the supervisor control module 270 may command the PFC control module 250 to produce a commanded bus voltage. The supervisor control module 270 may adjust the commanded bus voltage based on additional inputs, such as operating parameters of the inverter power module 208 and the measured voltage of the incoming AC line.

The supervisor control module 270 may diagnose faults in various systems of the drive controller 132. For example only, the supervisor control module 270 may receive fault information from the PFC control module 250 and/or the motor control module 260. The supervisor control module 270 may also receive fault information via the communications module 272. The supervisor control module 270 may manage reporting and clearing of faults between the drive controller 132 and the system controller 130.

Responsive to the fault information, the supervisor control module 270 may instruct the PFC control module 250 and/or the motor control module 260 to enter a fault mode. For example only, in the fault mode, the PFC control module 250 may halt switching of the switches of the PFC module 204, while the motor control module 260 may halt switching of the switches of the inverter power module 208. In addition, the motor control module 260 may directly provide fault information to the PFC control module 250. In this way, the PFC control module 250 can respond to a fault identified by the motor control module 260 even if the supervisor control module 270 is not operating correctly and vice versa.

The PFC control module 250 may control switches in the PFC module 204 using pulse width modulation (PWM). More specifically, the PFC control module 250 may generate PWM signals that are applied to the switches of the PFC module 204. The duty cycle of the PWM signals is varied to produce desired currents in the switches of the PFC module 204. The desired currents are calculated based on an error between the measured DC bus voltage and a desired DC bus voltage. In other words, the desired currents are calculated in order to achieve the desired DC bus voltage. The desired currents may also be based on achieving desired power factor correction parameters, such as the shapes of current waveforms in the PFC module 204. The PWM signals generated by the PFC control module 250 may be referred to as PFC PWM signals.

The motor control module 260 may control switches in the inverter power module 208 using PWM in order to achieve the commanded compressor speed. The PWM signals generated by the motor control module 260 may be referred to as inverter PWM signals. The duty cycle of the inverter PWM signals controls the current through the windings of the motor (i.e., motor currents) of the compressor 102. The motor currents control motor torque, and the motor control module 260 may control the motor torque to achieve the commanded compressor speed.

In addition to sharing fault information, the PFC control module 250 and the motor control module 260 may also share data. For example only, the PFC control module 250 may receive data from the motor control module 260 such as load, motor currents, estimated motor torque, inverter temperature, duty cycle of the inverter PWM signals, and other suitable parameters. The PFC control module 250 may also receive data from the motor control module 260, such as the measured DC bus voltage. The motor control module 260 may receive data from the PFC control module 250 such as AC line voltage, current(s) through the PFC module 204, estimated AC power, PFC temperature, commanded bus voltage, and other suitable parameters.

In various implementations, some or all of the PFC control module 250, the motor control module 260, and the supervisor control module 270 may be implemented on an integrated circuit (IC) 280. For example only, the IC 280 may include a digital signal processor (DSP), a field programmable gate array (FPGA), a microprocessor, etc. In various implementations, additional components may be included in the IC 280. Additionally, various functions shown inside the IC 280 in FIG. 2 may be implemented external to the IC 280, such as in a second IC or in discrete circuitry. For example only, the supervisor control module 270 may be integrated with the motor control module 260.

Figure 3A:
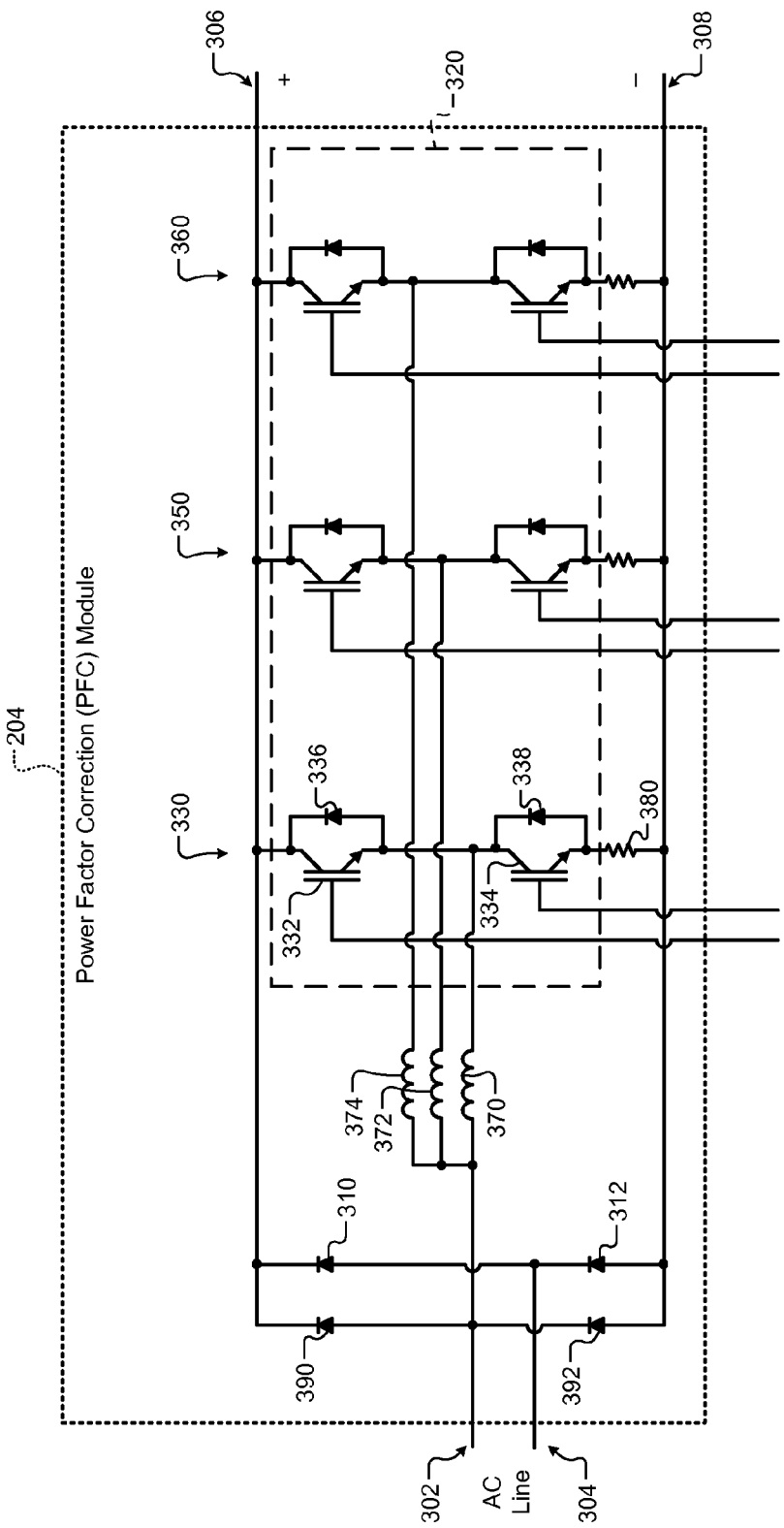
FIGS. 3a-3c are simplified schematics of example power factor correction (PFC) modules.

FIG. 3a is a schematic of an example implementation of the PFC module 204. The PFC module 204 receives AC power via first and second AC input terminals 302 and 304. The AC power may be, for example, the AC power output by the EMI filter 202. In various implementations, the signals at the first and second AC input terminals 302 and 304 may both be time-varying with respect to an earth ground. The PFC module 204 outputs DC power to the DC filter 206 and the inverter power module 208 via a positive DC terminal 306 and a negative DC terminal 308.

An anode of a first rectifier diode 310 is connected to the second AC input terminal 304, and a cathode of the first rectifier diode 310 is connected to the positive DC terminal 306. An anode of a second rectifier diode 312 is connected to the negative DC terminal 308, and a cathode of the second rectifier diode 312 is connected to the second AC input terminal 304. Each of the rectifier diodes 310 and 312 may be implemented as one or more individual series or parallel diodes.

A switch block 320 is connected between the positive and negative DC terminals 306 and 308. The switch block 320 includes a first PFC leg 330 that includes first and second switches 332 and 334. The switches 332 and 334 each include a first terminal, a second terminal, and a control terminal. In various implementations, each of the switches 332 and 334 may be implemented as an insulated gate bipolar transistor (IGBT). In such implementations, the first, second, and control terminals may correspond to collector, emitter, and gate terminals, respectively.

The first terminal of the first switch 332 is connected to the positive DC terminal 306. The second terminal of the first switch 332 is connected to the first terminal of the second switch 334. The second terminal of the second switch 334 may be connected to the negative DC terminal 308. In various implementations, the second terminal of the second switch 334 may be connected to the negative DC terminal 308 via a shunt resistor 380 to enable measuring current flowing through the first PFC leg 330.

The control terminals of the switches 332 and 334 receive generally complementary PFC PWM signals from the PFC control module 250. In other words, the PFC PWM signal provided to the first switch 332 is opposite in polarity to the PFC PWM signal provided to the second switch 334. Short circuit current may flow when the turning on of one of the switches 332 and 334 overlaps with the turning off of the other of the switches 332 and 334. Therefore, both the switches 332 and 334 may be turned off during a deadtime before either one of the switches 332 and 334 is turned on. Therefore, generally complementary means that two signals are opposite for most of their periods. However, around transitions, both signals may be low or high for some overlap period.

The first PFC leg 330 may also include first and second diodes 336 and 338 connected anti-parallel to the switches 332 and 334, respectively. In other words, an anode of the first diode 336 is connected to the second terminal of the first switch 332, and a cathode of the first diode 336 is connected to the first terminal of the first switch 332. An anode of the second diode 338 is connected to the second terminal of the second switch 334, and a cathode of the second diode 338 is connected to the first terminal of the second switch 334.

The switch block 320 may include one or more additional PFC legs. In various implementations, the switch block 320 may include one additional PFC leg. As shown in FIG. 3a, the switch block 320 includes second and third PFC legs 350 and 360. The number of PFC legs included in the switch block 320 may be chosen based on performance and cost. For example only, the magnitude of ripple (voltage and current) in the DC output of the PFC module 204 may decrease as the number of PFC legs increases. In addition, the amount of ripple current in the AC line current may decrease as the number of PFC legs increase. However, parts costs and implementation complexity may increase as the number of PFC legs increases.

The second and third PFC legs 350 and 360 of the switch block 320 may be similar to the first PFC leg 330. For example only, the second and third PFC legs 350 and 360 may each include respective components for the switches 332 and 334, the diodes 336 and 338, and respective shunt resisters connected in the same manner as the first PFC leg 330.

The PFC PWM signals provided to the switches of the additional PFC legs may also be complementary in nature. The PFC PWM signals provided to the additional PFC legs may be phase shifted from each other and from the PFC PWM signals provided to the first PFC leg 330. For example only, the phase shift of the PFC PWM signals may be determined by dividing 360 degrees) (°) by the number of PFC legs. For example, when the switch block 320 includes three PFC legs, the PFC PWM signals may be phase shifted from each other by 120° (or 180° for two phases, or 90° for four phases, etc.). Phase shifting the PFC PWM signals may cancel ripple in the AC line current as well as the DC output.

The PFC module 204 includes a first inductor 370. The first inductor 370 is connected between the first AC input terminal 302 and the second terminal of the first switch 332. Additional inductors may connect the first AC input terminal 302 to additional PFC legs. For example only, FIG. 3a shows a second inductor 372 and a third inductor 374 connecting the first AC input terminal 302 to the second and third PFC legs 350 and 360, respectively.

A voltage may be measured across the shunt resistor 380 to determine current through the first PFC leg 330 according to Ohm's law. An amplifier (not shown), such as an operational amplifier, may amplify the voltage across the shunt resistor 380. The amplified voltage may be digitized, buffered, and/or filtered to determine the current through the first PFC leg 330. Current through other PFC legs may be determined using respective shunt resistors.

Figure 3B:
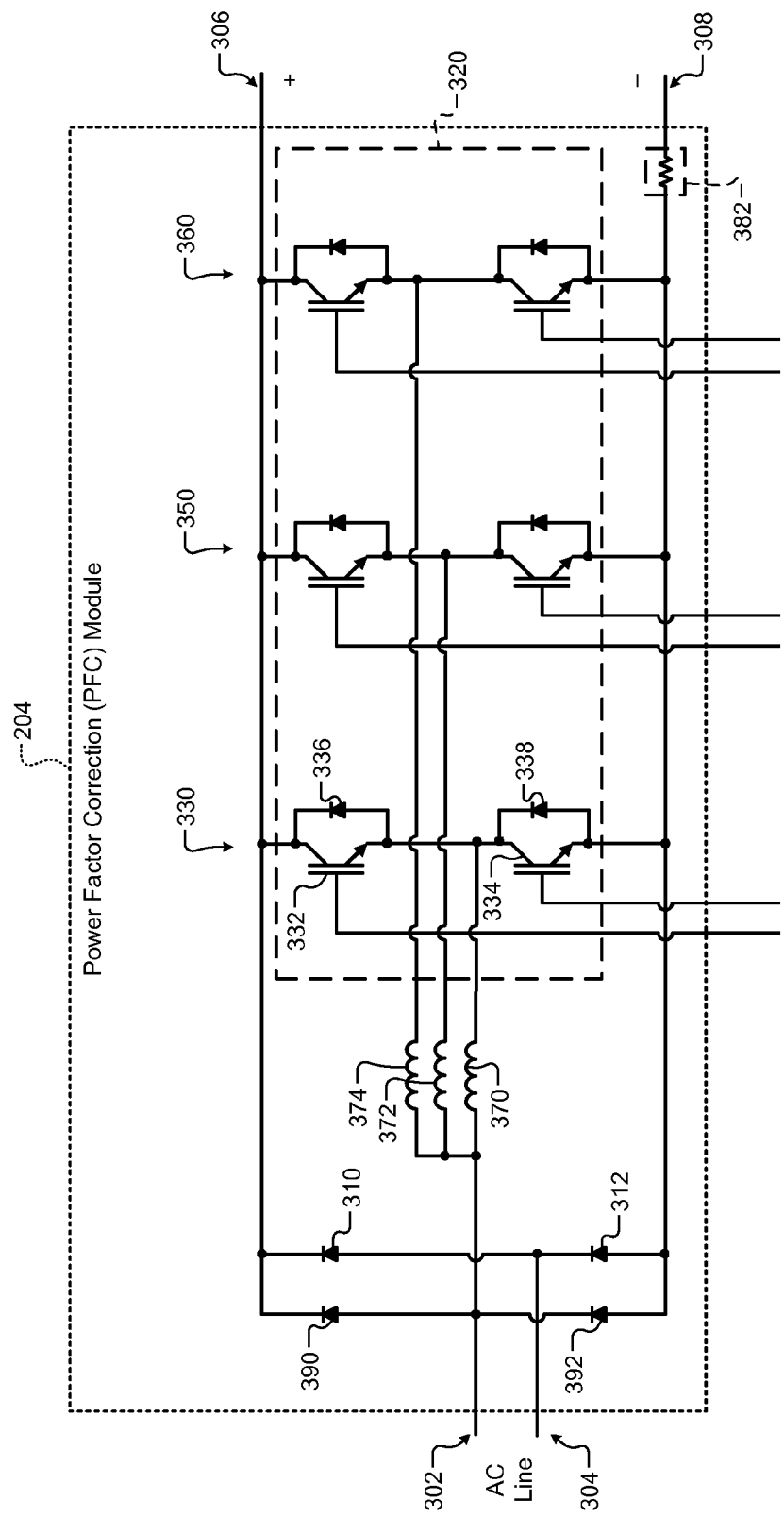

Additionally or alternatively, a resistor 382 may be connected in series with the negative DC terminal 308, as shown in FIG. 3b. Current through the resistor 382 may therefore indicate a total current output from the PFC module 204. Current through each of the PFC legs 330, 350, and 360 may be inferred from the total current based on the known phase timing of the current through the PFC legs 330, 350, and 360.

Figure 3C:
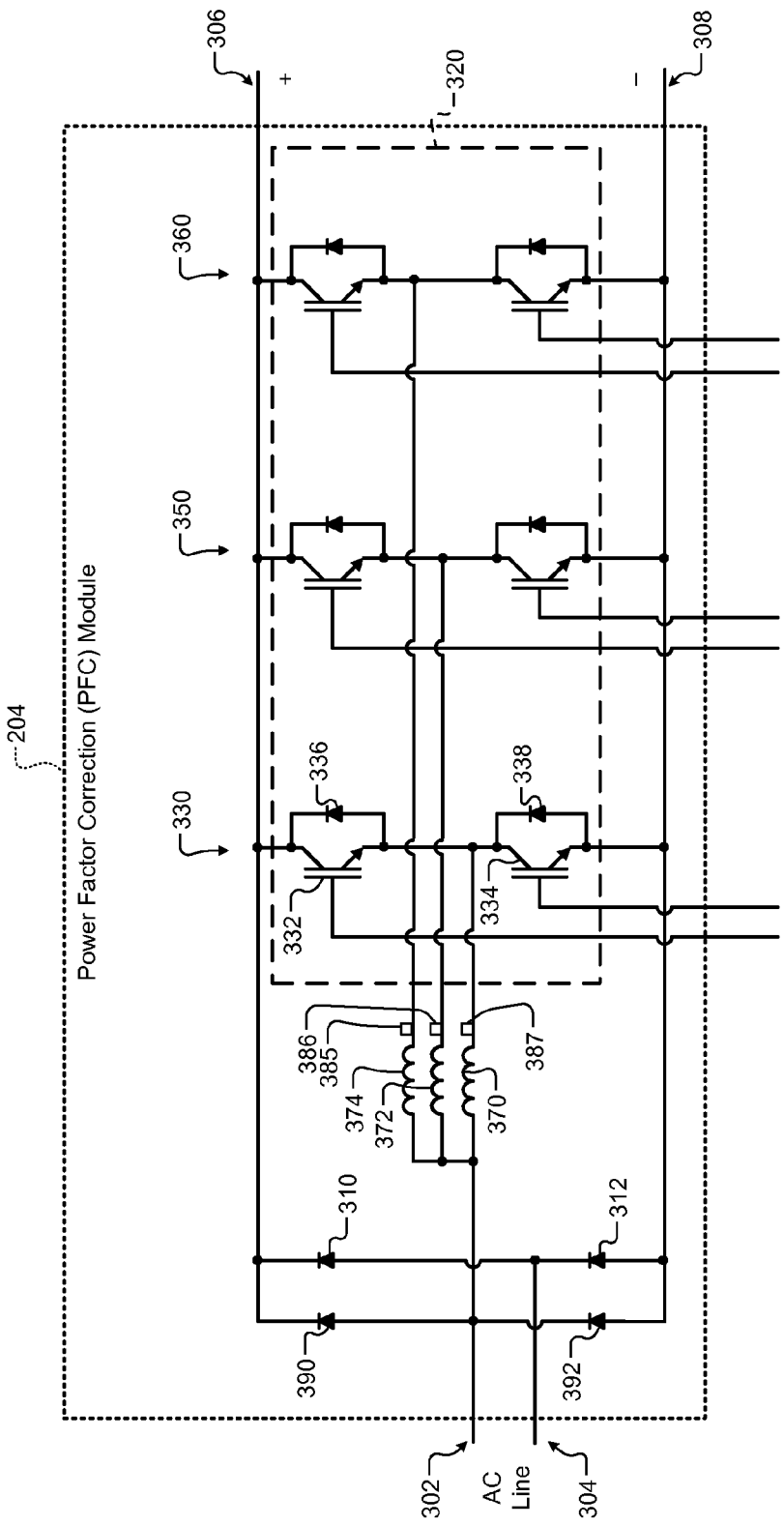

Any method of measuring or sensing current through any or all of the PFC legs 330, 350, 360 may be used. For example, in various implementations, the current through the first PFC leg 330 may be measured using a current sensor 387 (as shown in FIG. 3c). For example only, the current sensor 387 may be implemented in series with the first inductor 370. In various implementations, the current sensor 387 may include a Hall-effect sensor that measures the current through the first PFC leg 330 based on magnetic flux around the first inductor 370. Current through the PFC legs 350 and 360 may also be measured using associated current sensors 388 and 389, respectively.

The PFC module 204 may also include first and second bypass diodes 390 and 392. An anode of the first bypass diode 390 is connected to the first AC input terminal 302, and a cathode of the first bypass diode 390 is connected to the positive DC terminal 306. An anode of the second bypass diode 392 is connected to the negative DC terminal 308, and a cathode of the second bypass diode 392 is connected to the first AC input terminal 302.

The bypass diodes 390 and 392 may be power diodes, which may be designed to operate at low frequencies, such as, for example, frequencies less than approximately 100 Hz or approximately 200 Hz. Resistance of the bypass diodes 390 and 392 may be less than resistance of the inductors 370, 372, and 374. Therefore, when the switches 332 and 334 within the switch block 320 are not being switched, current may flow through the bypass diodes 390 and 392 instead of the diodes 336 and 338.

When the PFC module 204 is operating to create a boosted DC voltage, the boosted DC voltage will be greater than a peak voltage on the AC line. The bypass diodes 390 and 392 will therefore not be forward biased and will remain inactive. The bypass diodes 390 and 392 may provide lightning strike protection and power surge protection.

In various implementations, the bypass diodes 390 and 392 may be implemented with the rectifier diodes 310 and 312 in a single package. For example only, Vishay model number 26MT or 36MT or International Rectifier, model number 26MB or 36MB may be used as the bypass diodes 390 and 392 and the rectifier diodes 310 and 312. The rectifier diodes 310 and 312 carry current whether the PFC module 204 is generating a boosted DC voltage or not. Therefore, in various implementations, each of the rectifier diodes 310 and 312 may be implemented as two physical diodes connected in parallel. Current sensors may be used to measure PFC phase currents in series with the inductors 370, 372, and 374.

Figure 4A:
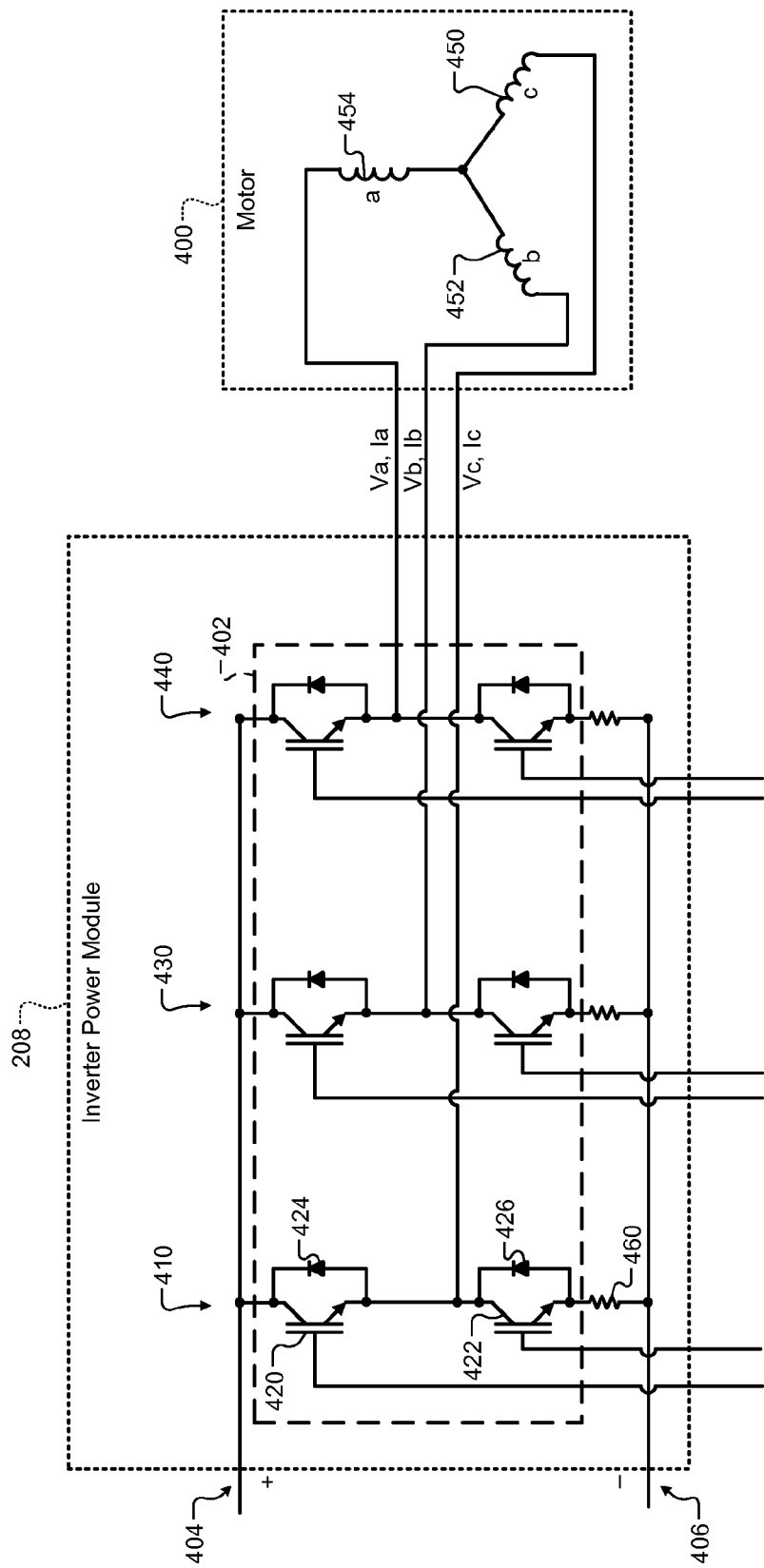
FIGS. 4a-4c are simplified schematics of example inverter power modules and example motors.

Referring now to FIG. 4a, a simplified schematic of a motor 400 and an example implementation of the inverter power module 208 is presented. The motor 400 is a component of the compressor 102 of FIG. 2. However, the principles of FIGS. 4a-4c may apply to other motors, including a motor of the condenser 104. The inverter power module 208 includes a switch block 402. In various implementations, the switch block 402 and the switch block 320 of the PFC module 204 may be implemented using a similar part. For example only, in FIG. 4a, a first inverter leg 410 includes first and second switches 420 and 422 and first and second diodes 424 and 426, which are arranged similarly to the switches 332 and 334 and the diodes 336 and 338 of FIG. 3a.

The switch block 402 receives the filtered DC voltage from the DC filter 206 via a positive DC terminal 404 and a negative DC terminal 406. The first terminal of the first switch 420 may be connected to the positive DC terminal 404, while the second terminal of the second switch 422 may be connected to the negative DC terminal 406. The control terminals of the switches 420 and 422 receive generally complementary inverter PWM signals from the motor control module 260.

The switch block 402 may include one or more additional inverter legs. In various implementations, the switch block 402 may include one inverter leg for each phase or winding of the motor 400. For example only, the switch block 402 may include second and third inverter legs 430 and 440, as shown in FIG. 4a. The inverter legs 410, 430, and 440 may provide current to windings 450, 452, and 454 of the motor 400, respectively. The windings 454, 452, and 450 may be referred to as windings a, b, and c, respectively. Voltage applied to the windings 454, 452, and 450 may be referred to as Va, Vb, and Vc, respectively. Current through the windings 454, 452, and 450 may be referred to as Ia, Ib, and Ic, respectively.

For example only, first ends of the windings 450, 452, and 454 may be connected to a common node. Second ends of the windings 450, 452, and 454 may be connected to the second terminal of the first switch 420 of the inverter legs 410, 430, and 440, respectively.

The inverter power module 208 may also include a shunt resistor 460 that is associated with the first inverter leg 410. The shunt resistor 460 may be connected between the second terminal of the second switch 422 and the negative DC terminal 406. In various implementations, respective shunt resistors may be located between each of the inverter legs 430 and 440 and the negative DC terminal 406. For example only, current through the first winding 450 of the motor 400 may be determined based on the voltage across the shunt resistor 460 of the first inverter leg 410. In various implementations, the shunt resistor of one of the inverter legs 410, 430, or 440 may be omitted. In such implementations, current may be inferred based on the measurements of the remaining shunt resistors.

Figure 4B:
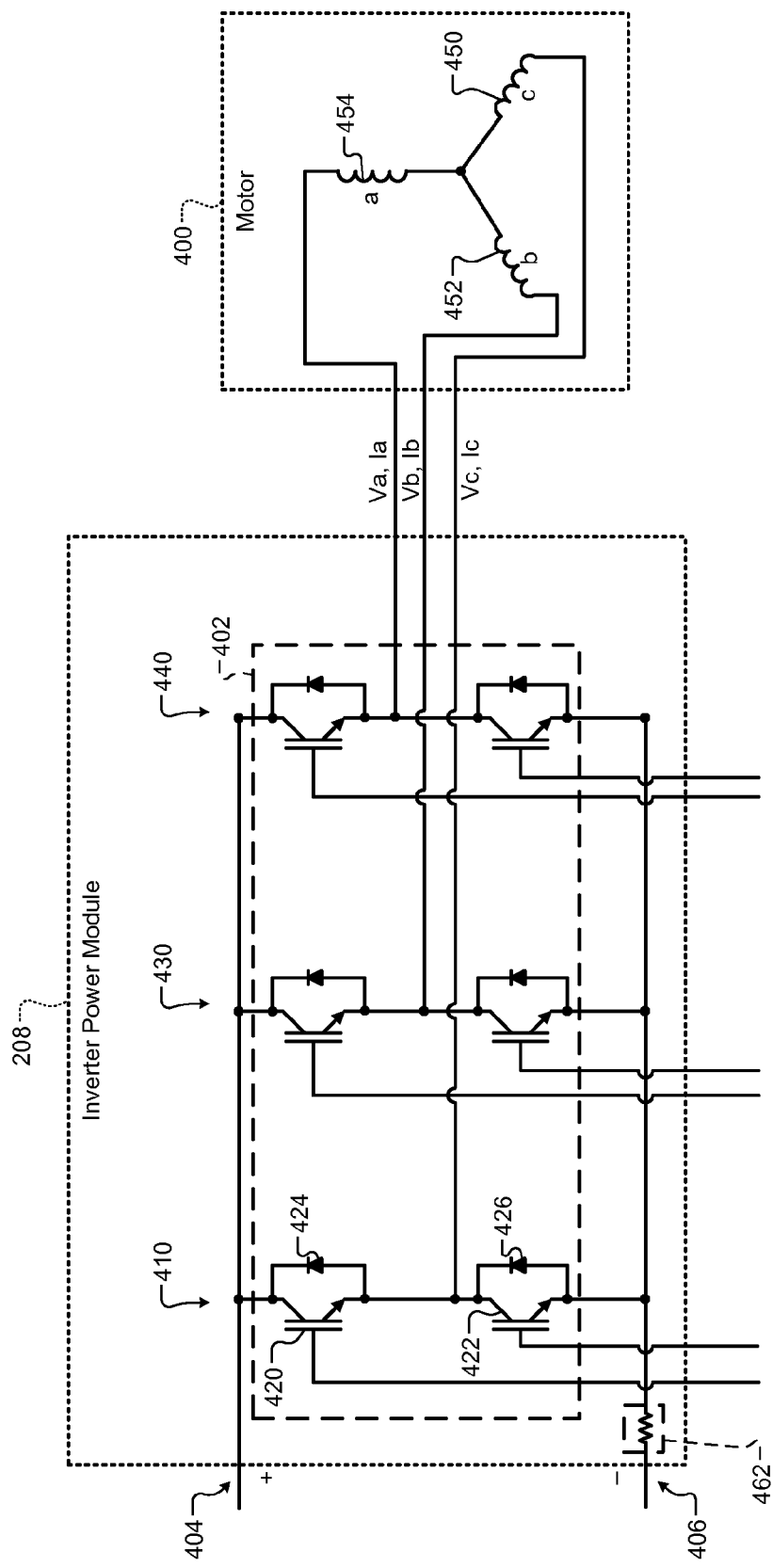
Figure 4C:
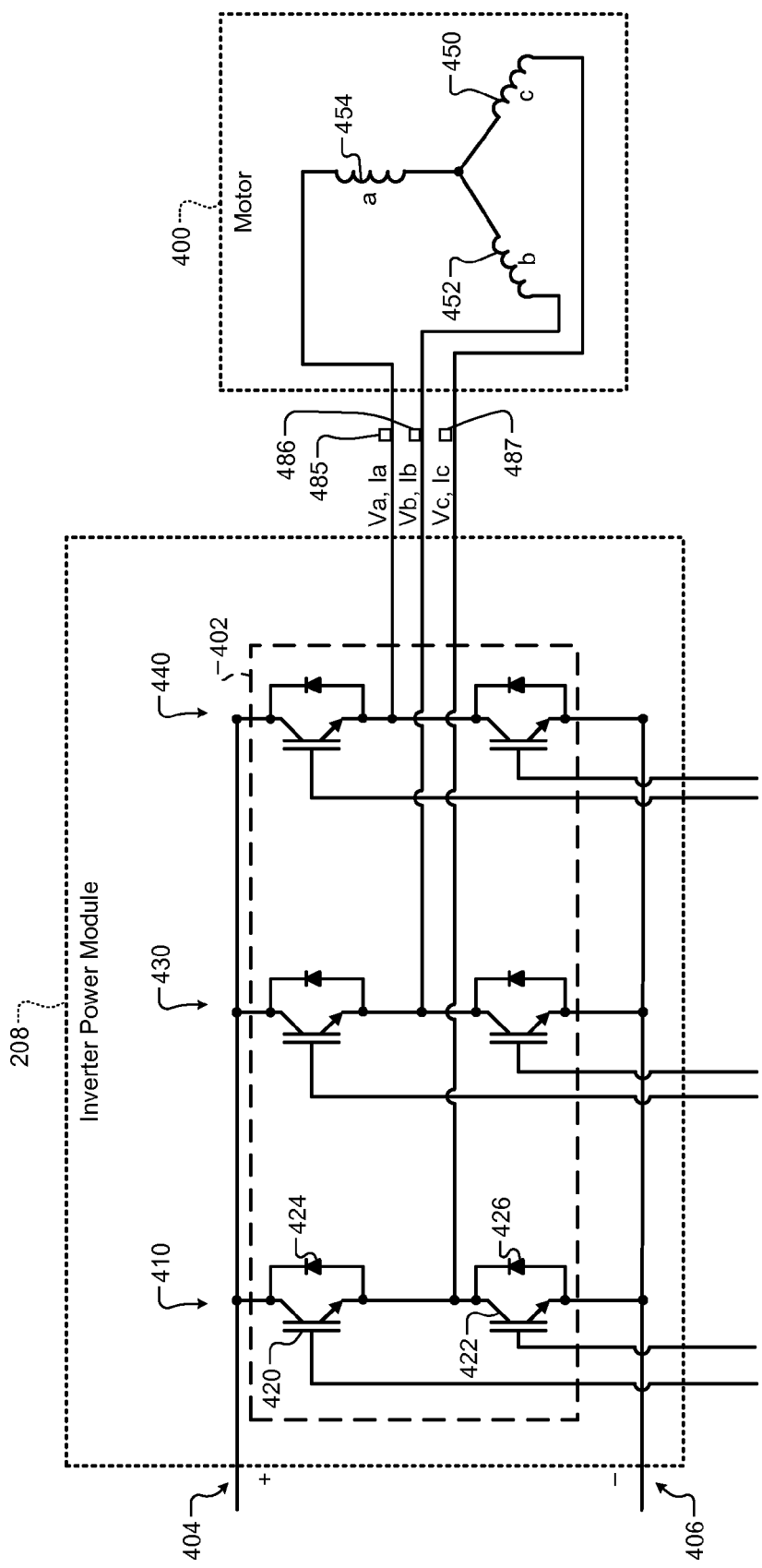

Additionally or alternatively, a resistor 462 may be connected in series with the negative DC terminal 406, as shown in FIG. 4b. Current through the resistor 462 may therefore indicate a total current consumed by the inverter power module 208. Current through each of the inverter legs 410, 430, and 440 may be inferred from the total current based on the known phase timing of the current through the inverter legs 410, 430, and 440. Further discussion of determining currents in an inverter can be found in commonly assigned U.S. Pat. No. 7,193,388, issued Mar. 20, 2007, which is incorporated by reference herein in its entirety.

Any method of measuring or sensing current through any or all of the inverter legs 410, 430, and 440 may be used. For example, in various implementations, the current through the first inverter leg 410 may be measured using a current sensor 487 (shown in FIG. 4c). For example only, the current sensor 487 may be implemented between the first inverter leg 410 and the first winding 450. Current through the inverter legs 430 and 440 may also be measured using associated current sensors 488 and 489, respectively. In various implementations, current sensors may be associated with two of the inverter legs 410, 430, and 440. The current through the other one of the inverter legs 410, 430, and 440 may be determined based on an assumption that the current in the motor windings sums to zero.

Figure 5:
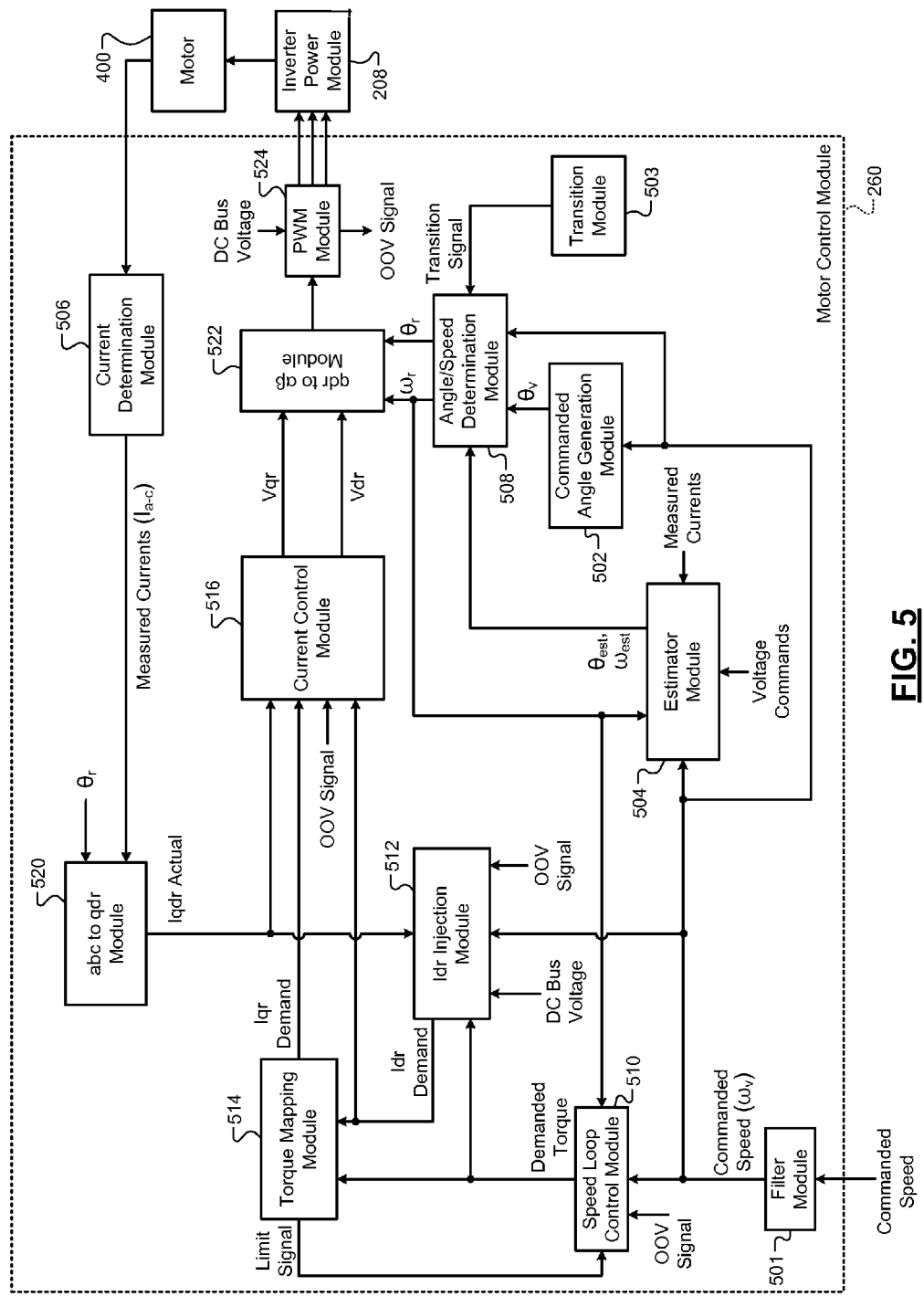
FIG. 5 is a functional block diagram of a motor control module according to the present disclosure.

Referring now to FIG. 5, an example implementation of the motor control module 260 of FIG. 2 is shown. The motor control module 260 controls switches within the inverter power module 208 to control voltages applied to the windings 454, 452, 450 (hereinafter, "windings$_{a-c}$") of the motor 400. This may also be referred to as controlling the inverter power module 208 or as controlling the motor 400.

For example, when the motor 400 includes a three-phase motor, the motor control module 260 may apply voltages $V_{a-c}$ to windings$_{a-c}$, respectively. Voltages $V_{a-c}$ may collectively be referred to as output voltages. Currents $I_{a-c}$ are generated in the windings$_{a-c}$, respectively, when voltages $V_{a-c}$ are applied to the windings$_{a-c}$. Currents $I_{a-c}$ may collectively be referred to as winding currents. Currents in the windings$_{a-c}$ produce magnetic flux about the windings$_{a-c}$, and vice versa. The motor control module 260 generates the output voltages to control the winding currents and/or to control magnetic flux.

The motor 400 includes a rotor (not shown) that rotates in response to the winding currents. The motor control module 260 controls the amplitude, duty cycle, and/or frequency of the output voltages to control the torque and speed of the rotor. The motor control module 260 may control the output voltages based on a commanded motor speed, which represents a desired rotational speed of the rotor.

The motor control module 260 may implement field oriented control of the motor 400. Accordingly, the motor control module 260 may map motor driving variables onto various frames of reference. Motor driving variables may include requested current/voltage values used to control the motor 400 as well as measured currents/voltages. For example, motor driving variables may include measured currents $I_{a-c}$ through the windings$_{a-c}$ and voltage requests used by the motor control module 260 to apply voltages $V_{a-c}$ to the windings$_{a-c}$.

The motor control module 260 may map motor driving variables in an abc frame of reference (FoR), an αβ FoR, and a qdr FoR. The abc FoR may represent, for example, a three-phase stator frame based on the windings$_{a-c}$. Each of the measured currents $I_{a-c}$ may be mapped onto respective axes a, b, and c of the abc FoR. Additionally, the motor control module 260 may map requested voltages corresponding to voltages $V_{a-c}$ in the abc FoR.

The αβ FoR includes stationary, stator-based x and y coordinates onto which the motor driving variables are projected. The qdr FoR is a rotating FoR that corresponds to the rotor and rotates in sync with the rotor. Accordingly, the qdr FoR is based on an angle of the rotor.

The motor control module 260 may transform motor driving variables from one FoR to another FoR. For example, the motor control module 260 may transform currents represented in the abc FoR into currents represented in the αβ FoR and vice versa. The motor control module 260 may transform motor driving variables from the abc FoR to the αβ FoR using a numerical transformation. The motor control module 260 may transform motor driving variables from the αβ FoR to the qdr FoR based on the angle of the rotor.

The motor control module 260 controls the inverter power module 208 based on the commanded speed from the supervisor control module 270 of FIG. 2. In various implementations, a filter module 501 may filter the commanded speed from the supervisor control module 270 of FIG. 2. In these implementations, the output of the filter module 501 is referred to below as the commanded speed $\omega_v$.

In open loop mode, the actual speed of the rotor will generally follow the commanded speed $\omega_v$, assuming that the commanded speed $\omega_v$ does not change too quickly. As a result, the coefficients of the low-pass filter of the filter module 501 may be chosen so that the rotor acceleration can keep up with changes in the commanded speed $\omega_v$ output from the filter module 501. Otherwise, rotor synchronization may be lost. In various implementations, the filter module 501 may implement a ramp function, which updates the commanded speed $\omega_v$ by up to a maximum increment during each predetermined interval of time.

The motor control module 260 may control the motor 400 based on a commanded FoR (e.g., a qdv FoR) when operating in open loop mode. The qdv FoR is associated with the commanded speed $\omega_v$ of the rotor and a commanded angle ($\theta_v$) of the rotor. A commanded angle generation module 502 may determine the commanded angle $\theta_v$, such as by integrating the commanded speed $\omega_v$.

The motor control module 260 may operate in various modes, such as open loop mode or a closed loop mode. For example only, the motor control module 260 may operate in open loop mode when starting the motor 400 and later transition to operating in closed loop mode. When operating in open loop mode, the rotor will tend to synchronize with the commanded speed $\omega_v$, especially when the motor control module 260 is operating the rotor at slower speeds. However, the actual rotor angle may differ from the commanded angle $\theta_v$ because of a load applied to the motor 400. For example, a change in load while operating in open loop mode may change a phase difference between the commanded angle $\theta_v$ and the actual rotor angle.

A transition module 503 determines when to transition the motor control module 260 from open loop mode to closed loop mode. For example only, the transition module 503 may determine when to transition based on at least one of the commanded speed $\omega_v$, an operating time of the motor 400, a commanded acceleration of the rotor, and/or feedback from an estimator module 504.

For example, the transition module 503 may predict the speed of the rotor based on the commanded acceleration and/or the operating time. The transition module 503 may transition from open to closed loop when the predicted speed is greater than a speed threshold. In various implementations, the transition module 503 may transition from open loop mode to closed loop mode when an elapsed time from when the motor 400 was started exceeds a predetermined period.

The estimator module 504 estimates the speed ($\omega_{est}$) and angle ($\theta_{est}$) of the rotor. The estimator module 504 may determine the estimated speed $\omega_{est}$ based on the estimated angle $\theta_{est}$. For example, the estimator module 504 may differentiate and filter the estimated angle $\theta_{est}$ over a period of time to determine the estimated speed $\omega_{est}$. The transition module 503 may transition from open to closed loop mode when the estimator module 504 has achieved stable estimates of the estimated angle $\theta_{est}$ and the estimated speed $\omega_{est}$. In various implementations, the transition module 503 may transition from open loop mode to closed loop mode when convergence in the estimator module 504 has occurred, which may be indicated by, for example, flux estimates.

Alternatively, the transition module 503 may transition from open loop mode to closed loop mode when the commanded speed $\omega_v$ is greater than the speed threshold. Alternatively or additionally, the transition module 503 may initiate a transition when the estimated speed $\omega_{est}$ of the rotor is greater than a predetermined speed. Other factors affecting when to perform the transition may include a load on the motor 400 and motor driving variables.

The estimator module 504 may determine the estimated angle $\theta_{est}$ based on various motor driving variables. For example, the motor driving variables may include $V_{a-c}$ to be applied to the windings$_{a-c}$ and $I_{a-c}$ measured in the windings$_{a-c}$. Additionally, the estimator module 504 may determine the estimated angle $\theta_{est}$ based on the commanded speed $\omega_v$. The estimator module 504 may implement a state observer (e.g., a Luenberger observer) to determine the estimated angle $\theta_{est}$ and the estimated speed $\omega_{est}$ based on the motor driving variables. Further description of sensorless control systems and methods can be found in U.S. Pat. No. 6,756,757, issued Jun. 29, 2004, U.S. Pat. No. 7,208,895, issued Apr. 24, 2007, U.S. Pat. No. 7,342,379, issued Mar. 11, 2008, and U.S. Pat. No. 7,375,485, issued May 20, 2008, which are incorporated herein by reference in their entirety.

A current determination module 506 may measure the currents $I_{a-c}$ of the windings$_{a-c}$ (hereinafter "measured currents"). The estimator module 504 may use the measured currents to estimate $\theta_{est}$ and $\omega_{est}$.

An angle/speed determination module 508 generates an output angle $\theta_r$ and an output speed $\omega_r$ based on the currently enabled mode, such as open loop mode or closed loop mode. The angle/speed determination module 508 may set the output angle $\theta_r$ equal to the commanded angle $\theta_v$ when operating in open loop mode and may set the output angle $\theta_r$ equal to the estimated angle $\theta_{est}$ when operating in closed loop mode.

When the transition module 503 instructs a transition from open loop mode to closed loop mode, the angle/speed determination module 508 gradually adjusts the output angle $\theta_r$ from the commanded angle $\theta_v$ to the estimated angle $\theta_{est}$. This gradual adjustment may minimize transient current demands when transitioning from open loop mode to closed loop mode, which may prevent disruption of current control (described below) and/or estimation of the estimated angle $\theta_{est}$. The gradual adjustment may therefore improve stability during transitions and allow for starting the motor 400 more reliably, especially under higher loads.

The angle/speed determination module 508 may set the output speed $\omega_r$ equal to the commanded speed $\omega_v$ when operating in open loop mode. The angle/speed determination module 508 may set the output speed $\omega_r$ equal to the estimated speed $\omega_{est}$ when operating in closed loop mode. In various implementations, the angle/speed determination module 508 may immediately switch the output speed $\omega_r$ from the commanded speed $\omega_v$ to the estimated speed $\omega_{est}$ when the transition module 503 instructs a transition from open loop mode to closed loop mode.

The transition module 503 may also instruct a change from closed loop mode back to open loop mode. For example only, a transition back to open loop mode may be performed when error conditions, such as a lost rotor, or abnormal operating conditions, are observed. The angle/speed determination module 508 may therefore also switch the output speed $\omega_r$ from the estimated speed $\omega_{est}$ back to the commanded speed $\omega_v$, and switch the output angle $\theta_r$ from the estimated angle $\theta_{est}$ back to the commanded angle $\theta_v$. In various implementations, similarly to the transition from open loop mode to closed loop mode, switching the output speed $\omega_r$ may be performed immediately, while switching the output angle $\theta_r$ may be performed gradually.

In various implementations, additional modes may be supported. For example only, three, four, or more modes may be supported. The transition module 503 may instruct the angle/speed determination module 508 to transition from one of the modes to another. During each transition, the angle/speed determination module 508 may switch the output speed $\omega_r$ immediately to a speed corresponding to the selected mode. Alternatively, the output speed $\omega_r$ may be ramped toward the speed of the selected mode. Further, the angle/speed determination module 508 ramps the output angle $\theta_r$ toward an angle corresponding to the selected mode. The transition module 503 may instruct the angle/speed determination module 508 to transition from one of the modes to another using a transition signal. For example, the transition signal may specify a target mode to which the angle/speed determination module 508 should transition.

A speed loop control module 510 generates a demanded torque signal calculated to match the output speed $\omega_r$ to the commanded speed $\omega_v$. In various implementations, the speed loop control module 510 may be bypassed in open loop mode. In closed loop mode, the output speed $\omega_r$ is equal to the estimated speed $\omega_{est}$ of the motor 400. Therefore, the speed loop control module 510 may generate the demanded torque signal in order to keep the speed of the motor 400 approximately equal to the commanded speed $\omega_v$. For example only, when the output speed $\omega_r$ is less than the commanded speed $\omega_v$, the speed loop control module 510 may increase the demanded torque, and vice versa.

An Idr injection module 512 generates a d-axis current (Idr) demand based on the DC bus voltage, the demanded torque signal, and the commanded speed $\omega_v$. The Idr demand is used by current control, described below, for Idr injection, which may also be referred to as field weakening or phase advance. In various implementations, the Idr injection module 512 may adjust the Idr demand based on an out-of-volts (OOV) signal, described below, and measured current.

A torque mapping module 514 generates a q-axis current (Iqr) demand based on the demanded torque signal. Torque may also be generated by the Idr demand and therefore, the torque mapping module 514 may determine the Iqr demand based also on the Idr demand. For example only, the torque mapping module 514 may implement a maximum current limit. In various implementations, the torque mapping module 514 may compare a combination of the Idr demand and the Iqr demand to the maximum current limit, and reduce one or both of the demands when the combination exceeds the maximum current limit. In various implementations, the torque mapping module 514 may limit only the Iqr demand. For example only, the maximum current limit may be a root mean square limit, such as 25 Amps$_{rms}$.

When the torque mapping module 514 is limiting the Iqr demand to meet the maximum current limit, the torque mapping module 514 may output a limit signal to the speed loop control module 510. When the limit signal is received, the speed loop control module 510 may temporarily suspend increasing the demanded torque. In addition, the speed loop control module 510 may also temporarily suspend increasing the demanded torque based on the OOV signal.

For example only, the speed loop control module 510 may attempt to match the output speed $\omega_r$ to a reduced version of the commanded speed $\omega_v$. Alternatively or additionally, the speed loop control module 510 may selectively suspend error summing and/or integrating operation that would lead to increasing the demanded torque. In other words, when the torque mapping module indicates, via the limit signal, that the maximum current limit is reached, the speed loop control module 510 may stop increasing the demanded torque because the present demanded torque already cannot be achieved within the maximum current limit.

A current control module 516 determines voltage commands Vqr and Vdr, in the qdr FoR, based on the current demands Iqr and Idr. The voltage commands Vqr and Vdr may be a q-axis voltage command and a d-axis voltage command, respectively. In various implementations, the current control module 516 may determine the voltage commands Vqr and Vdr based also on the measured currents. In various implementations, the current control module 516 may attempt to match the measured currents to the Iqr and Idr demands by adjusting the voltage commands Vqr and Vdr. In various implementations, the current control module 516 may also receive the output speed $\omega_r$.

An abc to qdr module 520 maps the measured currents $I_{a-c}$ onto the qdr FoR based on the output angle $\theta_r$. The resulting mapped current may be referred to as Iqdr, and may include Iqr and Idr components. The measured currents used by components of the motor control module 260, such as the current control module 516, may therefore use the Iqdr representation of the measured currents.

A qdr to αβ module 522 may transform the voltage commands Vqr and Vdr from the qdr FoR to the αβ FoR, thereby generating a voltage request in the αβ FoR (hereinafter "voltage request"). The voltage request may indicate the voltages to be applied to the windings$_{a-c}$. The qdr to αβ module 522 may perform the transformation based on the output angle $\theta_r$, and in various implementations, may perform the transformation based on the output speed $\omega_r$.

A pulse-width modulation (PWM) module 524 generates duty cycle signals to control the inverter power module 208 using PWM. For example only, the PWM switching frequency may be approximately 5 kHz or approximately 10 kHz. In various implementations, the inverter power module 208 and the motor 400 have three phases, and the PWM module 524 generates three duty cycle signals, one for each inverter leg.

In various implementations, each leg of the inverter power module 208 includes a pair of complementary switches, and each of the duty cycle signals is therefore converted into complementary duty cycle signals, one for each of the complementary switches. For example only, referring to FIG. 4a, the switch 420 and the switch 422 of the first inverter leg 410 may be controlled with complementary duty cycles.

In various implementations, to prevent a short circuit condition, where both the switches 420 and 422 are on simultaneously, the complementary duty cycles may be adjusted so that a switch is not turning on at the same time the other switch is turning off. In other words, the off-times of the two switches are partially overlapped.

The PWM module 524 determines the duty cycle signals based on the DC bus voltage and the voltage requests from the qdr to αβ module 522. For example only, the PWM module 524 may transform the voltage request from the αβ FoR to the abc FoR to determine three voltage demands, hereinafter $Vr_a$, $Vr_b$, and $Vr_c$ (collectively $Vr_{a-c}$), corresponding to the windings$_{a-c}$, respectively.

When the voltage demands can not be met given the present DC bus voltage, the drive controller 132 is defined to be operating in the OOV state. For example only, a maximum duty cycle may be defined in the PWM module 524. If the voltage demands would result in one of the duty cycles being greater than the maximum duty cycle, the drive controller 132 is operating in the OOV state.

In various implementations, the maximum duty cycle may be set to be less than 100%, such as 96%, 95%, or 92%. The maximum duty cycle limit may be set based on requirements for accurate measurement of the winding currents $I_{a-c}$. A corresponding minimum duty cycle limit may also be defined. For example only, the minimum duty cycle limit may be equal to one minus the maximum duty cycle limit.

In various implementations, the motor 400 may respond not to the winding voltages themselves, but instead to differences between the winding voltages. As a simplistic example, applying 50 Volts to a first winding and 150 Volts to a second winding may be equivalent to applying 0 Volts to the first winding and 100 Volts to the second winding. Therefore, even if one of the voltage demands may exceed an available voltage, the PWM module 524 may shift the voltage demands when generating the duty cycles.

In such implementations, the PWM module 524 may determine that the drive controller 132 is in the OOV state when a difference between any two of the three voltage demands is greater than the available voltage. For example only, the available voltage may be equal to the DC bus multiplied by the maximum duty cycle. In various implementations, the PWM module 524 may shift the duty cycles such that one of the duty cycles is set to zero. Alternatively, the PWM module 524 may shift the duty cycles such that the duty cycles are centered about a middle duty cycle, such as 50%. In various implementations, the PWM module 524 may shift the duty cycles using one or the other of these approaches, depending on an operating mode. For example only, the PWM module 524 may shift the duty cycles such that the lowest duty cycle is set to zero when the motor 400 is operating at speeds above a predetermined threshold.

In the OOV state, the difference between the duty cycles corresponding to the voltage demands is greater than the difference between the minimum and maximum duty cycles. Therefore, when operating in the OOV state, the PWM module 524 may scale the voltage demands down before generating the duty cycles. Equivalently, the PWM module 524 may scale the duty cycles. In various implementations, the PWM module 524 may scale the duty cycles or voltage demands as little as possible, such that one of the duty cycles is set to the minimum duty cycle, and one of the duty cycles is set to the maximum duty cycle.

The scaling factor is an indication of how far OOV the drive controller 132 currently is. The scaling factor may be referred to as OOV magnitude, and may be included in the OOV signal. In the OOV state, the PWM module 524 sets an OOV flag to a first value, such as 1. When not in the OOV state, the PWM module 524 sets the OOV flag to a second value, such as 0. The OOV flag may be included in the OOV signal.

An OOV amount may be determined based on the OOV flag. For example only, the OOV amount may indicate how often the drive controller 132 is operating OOV. For purposes of illustration only, the inverter power module 208 may define an operating region shaped like a hexagon. The voltage demands may be thought of as circles within the hexagon. If the circles are centered within the hexagon, as the circles expand, they will touch the sides of the hexagon. When the circles expand beyond the hexagon, the circles become more and more clipped at each face of the hexagon. Clipping may correspond to the OOV state. As a result, the proportion of time that the voltage demands are clipping (producing the OOV state) indicates how far OOV the driver controller 132 is.

The OOV amount may represent a portion of the time that the drive controller 132 is spending in the OOV state. The OOV amount may be determined by applying a filter, such as a digital low-pass filter, to the OOV flag. For example only, the OOV amount may be determined by applying a moving average to the OOV flag. When the OOV flag assumes values of 0 or 1, the OOV amount will then range between 0 and 1, inclusive. When multiplied by 100, the OOV amount is the percentage of time the drive controller 132 is spending in the OOV state.

The motor control module 260 may use multiple approaches to minimize OOV operation, or to maintain OOV operation below a predetermined threshold. In various implementations, the Idr injection module 512 may use the OOV amount in determining how to adjust the Idr demand. The speed loop control module 510 may also use the OOV amount to determine when to suspend increases in the demanded torque. The current control module 516 may suspend increases to one or both of the Vqr and Vdr commands based on the OOV flag.

Figure 6:
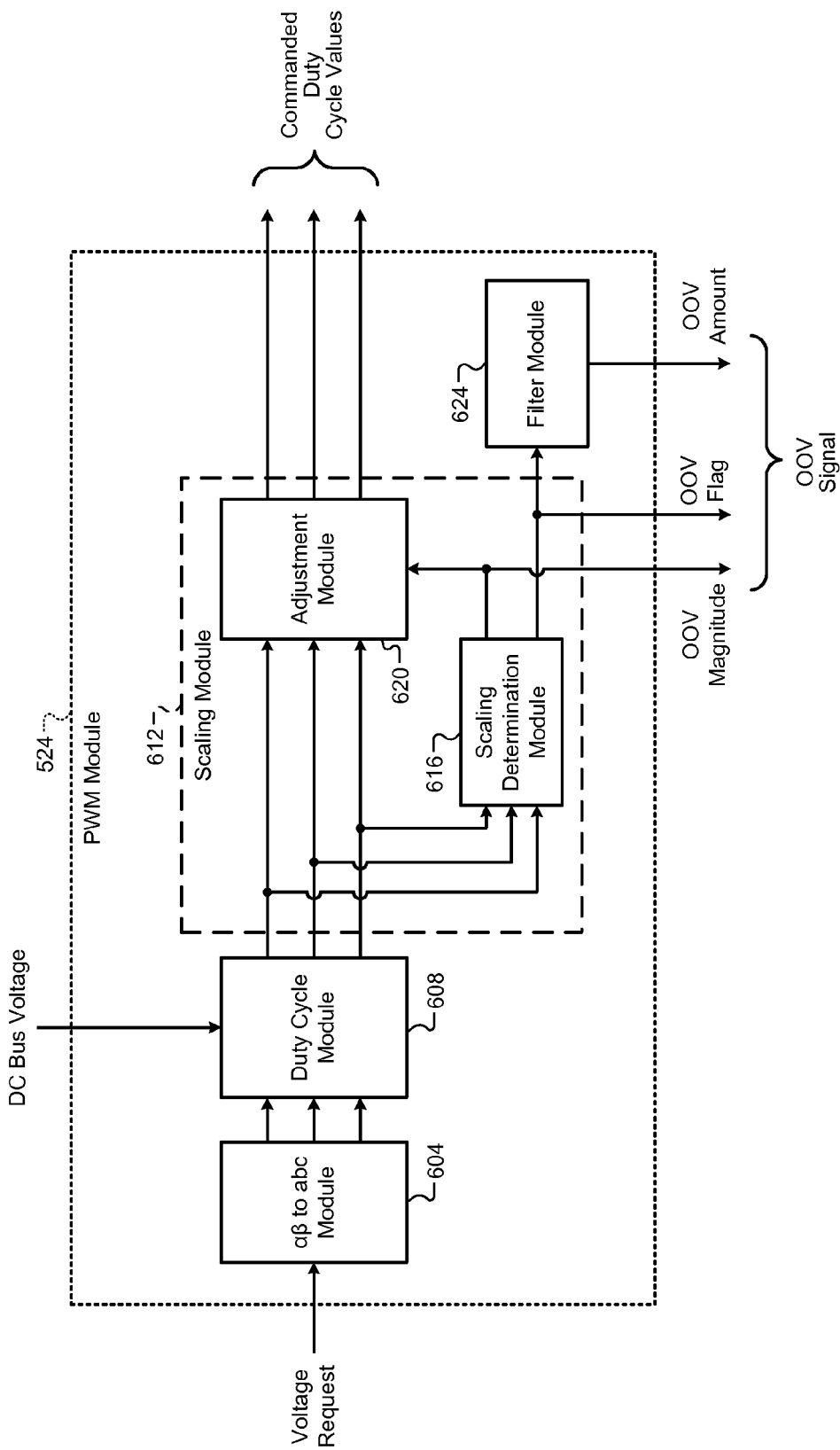
FIG. 6 is a functional block diagram of an out-of-volts (OOV) module according to the present disclosure.

Referring now to FIG. 6, an example implementation of the PWM module 524 is shown. The PWM module 524 may include an αβ to abc module 604, which transforms the voltage requests from the qdr to αβ module 522 into the abc FoR, resulting in three voltage demands, one corresponding to each of the three windings of the motor 400. The three voltage demands may represent the instantaneous voltages to be applied to the respective windings to generate desired currents.

In order to effectuate the voltage demands, the PWM module 524 converts the three voltage demands into three duty cycle values. Each of the duty cycle values is then used to control switches for a corresponding one of the motor windings. Because the inverter power module 208 is powered by the DC bus, a duty cycle module 608 may generate preliminary duty cycle values based on the voltage demands and the DC bus voltage.

In various implementations, the preliminary duty cycle values may be calculated by dividing the voltage demands by the DC bus voltage. For purposes of illustration only, when the DC bus voltage is 400 V, and a voltage demand is 320 V, the corresponding preliminary duty cycle may be 80% (320/400). The duty cycle module 608 outputs the three preliminary duty cycle values to a scaling module 612.

In various operating regimes, one or more of the preliminary duty cycle values may exceed a maximum duty cycle. For example only, the maximum duty cycle may be set to 100%, which is by definition the largest duty cycle that can be produced. Alternatively, the maximum duty cycle may be less than 100%, such as 96%, 95%, or 92%. The maximum duty cycle may be set less than 100% in order to ensure sufficient current in certain circuit paths of the inverter power module 208 to allow current to be accurately measured.

In various implementations, the motor 400 may respond to differences between the voltages applied to the windings, and not to the voltages themselves. For this reason, the scaling module 612 may be able to shift the preliminary duty cycle values to generate the duty cycle values. For purposes of illustration only, if the lowest one of the preliminary duty cycle values is 80% and the greatest one of the preliminary duty cycle values is 120%, the scaling module 612 may shift the three preliminary duty cycle values downward by at least 20%.

For example only, the scaling module 612 may shift the preliminary duty cycle values so that the highest and lowest preliminary duty cycle values are centered about a predetermined value, such as 50%. Alternatively, the scaling module 612 may shift the preliminary duty cycle values so that an average of the preliminary duty cycle values is equal to a predetermined value, such as 50%. In another alternative, the scaling module 612 may shift the preliminary duty cycle values so that the lowest of the preliminary duty cycle values is set to zero. In yet another alternative, the scaling module 612 may shift the preliminary duty cycle values so that the highest of the preliminary duty cycle values is set to the maximum duty cycle.

Using the above numeric example, the first approach may shift preliminary duty cycle values of 80% and 120% down to 30% and 70%, respectively, so that they are centered about 50%. The second approach depends on the value of the middle preliminary duty cycle value. The third approach may shift preliminary duty cycle values of 80% and 120% down to 0% and 40%, respectively. The fourth approach, using a maximum duty cycle of 95% for example only, may shift preliminary duty cycle values of 80% and 120% down to 55% and 95%, respectively.

In various implementations, two or more of these approaches may be used at various times by the scaling module 612. For example only, the scaling module 612 may shift the preliminary duty cycle values so that the lowest value is equal to zero when the motor 400 is operating above a predetermined speed. When the motor is operating below the predetermined speed, the scaling module 612 may shift the preliminary duty cycle values so that the highest and lowest preliminary duty cycle values are centered about the predetermined value.

The scaling module 612 therefore shifts the preliminary duty cycle values to reduce the maximum one of the preliminary duty cycle values to below the maximum duty cycle. In various implementations, however, the scaling module 612 may shift the preliminary duty cycle values according to the selected approach even if all of the preliminary duty cycle values are less than the maximum duty cycle.

Even once the scaling module 612 has shifted the preliminary duty cycle values, one or two of the shifted preliminary duty cycle values may still be greater than the maximum duty cycle. This condition is referred to out-of-volts (OOV), as mentioned above. When the OOV condition is present, the scaling module 612 reduces the highest of the shifted preliminary duty cycle values down to the maximum duty cycle. This reduction is referred to herein as scaling.

The amount of scaling necessary may be referred to as an OOV magnitude. Meanwhile, an OOV flag indicates whether scaling is presently being performed ((i.e., when the OOV condition is present). In various implementations, the OOV flag may be set to 1 when scaling is being performed and set to 0 otherwise.

The scaling module 612 may reduce a middle one of the shifted preliminary duty cycle values by the same scaling factor as used for the highest of the shifted preliminary duty cycle values. The scaling module 612 outputs the preliminary duty cycle values, which may be shifted and/or scaled, as commanded duty cycle values for the inverter power module 208.

The scaling module 612 may include a scaling determination module 616 that receives the preliminary duty cycle values and determines whether scaling is necessary. If so, the scaling determination module 616 sets the OOV flag to a first value, such as 1; otherwise, the scaling determination module 616 sets the OOV flag to a second value, such as 0.

In addition, the scaling determination module 616 may output a scaling factor to an adjustment module 620. The scaling factor may also be output from the PWM module 524 as an OOV magnitude. The scaling factor may be a number that, when multiplied by the highest of the shifted preliminary duty cycles, will equal the maximum duty cycle. The adjustment module 620 selectively shifts the preliminary duty cycle values. The adjustment module 620 then scales the preliminary duty cycle values as necessary based on the scaling factor. The adjustment module 620 then outputs the scaled results as the commanded duty cycle values.

The PWM module 524 may also include a filter module 624. The filter module 624 applies a filter to the OOV flag in order to generate an OOV amount. For example only, the filter module 624 may apply a digital filter based on a moving average such as the following weighted moving average:

$$y(k)=\alpha \cdot y(k-1)+(1-\alpha)\cdot x(k)$$

where x(k) is the input at sample interval k and the value of α sets the rate at which the contribution of older samples decreases.

When the OOV flag assumes values of either 0 or 1, the OOV amount will range between 0 and 1. A value closer to 1 will indicate that the OOV condition is occurring frequently, and when the OOV amount reaches 1, the OOV condition will have been present continuously for as long as a filter window of the filter module 624 extends back. Similarly, when the OOV amount reaches 0, the OOV condition will have been absent for the length of the filter window.

For example only, the filter window may be longer than the time it takes for the rotor of the motor 400 to complete one revolution. The OOV amount may then correspond to a percentage of time during the rotor's revolution that the OOV condition is present. For purposes of illustration only, OOV operation may be thought of as a circular balloon constrained by a hexagon. As the circle expands, the circle will eventually contact the hexagon on each of the sides of the hexagon. If the circle expands any further, the hexagon will restrict the circle on each of the sides of the hexagon, leading to flat spots on the circle. These flat spots correspond to the OOV condition. As the circle attempts to expand further, more and more of the circle is flattened by the hexagon, corresponding to a greater OOV amount.

The OOV amount may be specified as a percentage by multiplying by 100. In various implementations, low values of the OOV amount, such as values below a predetermined threshold, may be acceptable, while the motor control module 260 may attempt to restrict the OOV amount from increasing above the predetermined threshold.

Figure 7:
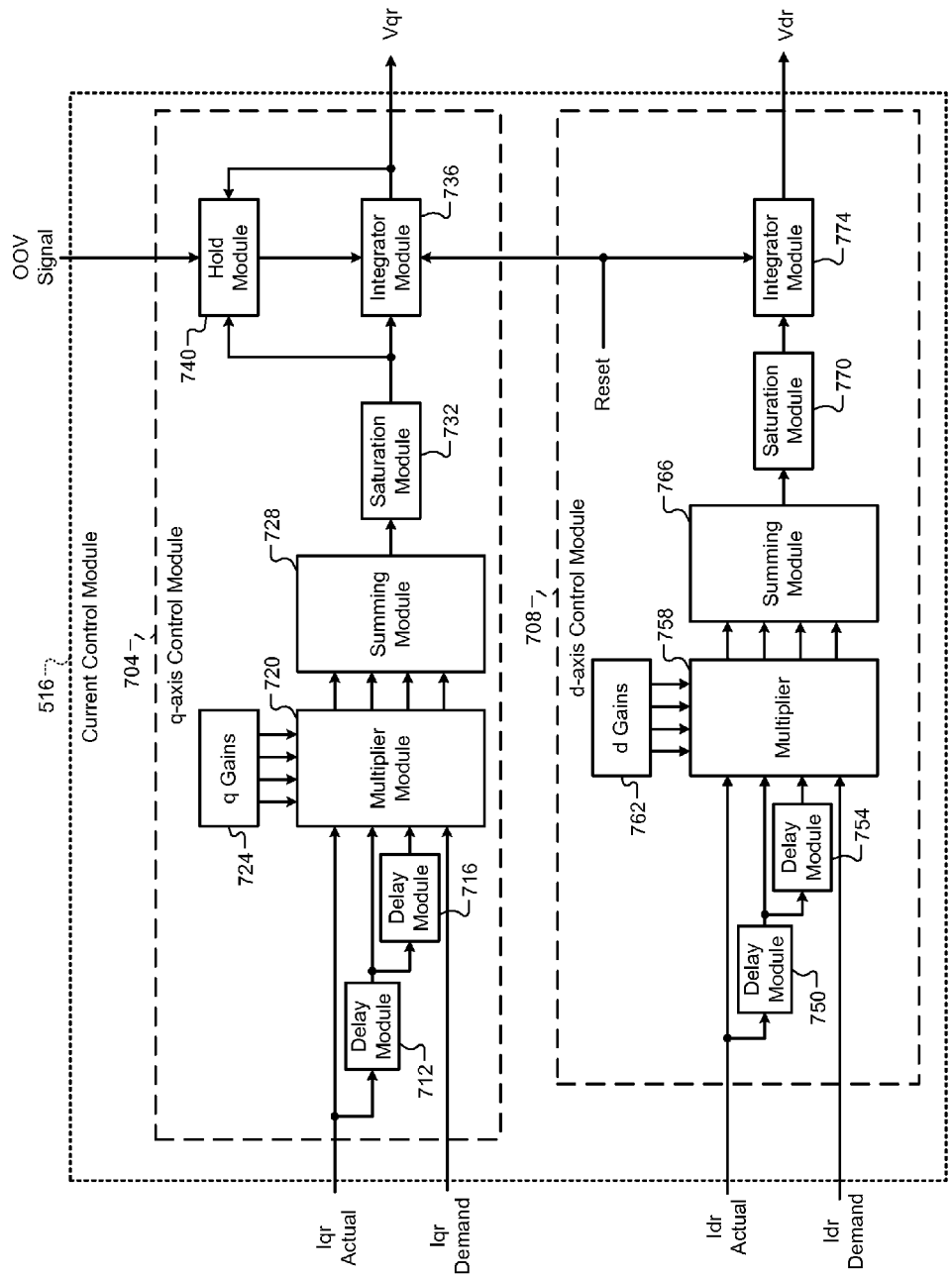
FIG. 7 illustrates a method for controlling a system in an OOV state according to the present disclosure.

Referring now to FIG. 7, an example implementation of the current control module 516 is shown. The current control module 516 may implement a proportional-integral-derivative (PID) control algorithm. The proportional, integral, and derivative components may be evaluated at discrete time intervals and used to generate an output, which is a desired change in control action. This change in control action is summed to produce the desired control action.

A PID control algorithm can be written in a velocity form as follows. The change in control action at the nth sample, $m_n$, is given by:

$$m_n = K_1 * s_n + K_2 * s_{n-1} + K_3 * s_{n-2} + K_4 * d,$$

where $K_1$, $K_2$, $K_3$, and $K_4$ are predetermined constants, $s_n$, $s_{n-1}$, and $s_{n-2}$ are the system states at the present time (the nth sample), the previous sample (n−1) and two samples ago (n−2), respectively, and d is the system demand. The control action at the nth sample is then given by:

$$c_n = c_{n-1} + m_n,$$

where $c_{n-1}$ is the control action from the previous sample (n−1). The system states represent the actual measured state of the system, while the demand represents the desired state of the system. Therefore, in various implementations, the sign of $K_4$ may be opposite of the signs of $K_1$, $K_2$, and $K_3$.

The current control module 516 may include a q-axis control module 704 and a d-axis control module 708. The q-axis and d-axis control modules 704 and 708 may operate independently or may provide feedback from one to the other. The q-axis control module 704 may generate the Vqr voltage command in order to cause the actual (measured) Iqr to match the Iqr demand. Similarly, the d-axis control module 708 may generate the Vdr voltage command in order to cause the actual (measured) Idr to match the Idr demand. In various implementations, the actual Iqr and Idr values are components of the actual Iqdr received from the abc to qdr module 520 of FIG. 5.

The q-axis and d-axis control modules 704 and 708 may implement PID control algorithms, where the system demands are the Iqr demand and the Idr demand, respectively, and the system states are the actual Iqr and the actual Idr, respectively.

In an example implementation of the q-axis control module 704, a first delay module 712 receives the actual Iqr and outputs a delayed version of the actual Iqr. A second delay module 716 receives the delayed Iqr and creates a further delayed Iqr. The Iqr, the delayed Iqr, and the further delayed Iqr are received by a multiplier module 720. The multiplier module 720 also receives the Iqr demand.

In various implementations, the current control module 516 may perform control iterations at periodic intervals. In such implementations, each of the values in the current control module 516 may be updated at each iteration. The first and second delay modules 712 and 716 may each delay their input value by one iteration. The multiplier module 720 multiplies each of its inputs by the respective gain, referred to as q gains 724. These products are added together by a summing module 728 to produce a single value. In various implementations, the signs of the gains for the actual Iqr may be opposite to the sign of the gain for the Iqr demand.

A saturation module 732 may apply an upper limit and/or a lower limit to the single value from the summing module 728. The saturation module 732 may prevent instability by limiting the change in any given iteration to a predetermined acceptable amount. An integrator module 736 receives an output of the saturation module 732 and generates an output equal to a previous output of the integrator module 736 plus the output from the saturation module 732.

However, a hold module 740 may suspend operation of the integrator module 736 based on the OOV signal. In various implementations, the hold module 740 may suspend operation of the integrator module 736 when the OOV flag indicates that the OOV condition is currently present. Presence of the OOV condition indicates that the Vqr voltage command already can not be satisfied by the DC bus voltage. Therefore, the hold module 740 prevents the integrator module 736 from requesting a continually increasing Vqr voltage command.

The hold module 740 may monitor the input and the output of the integrator module 736 and evaluate whether an iteration of the integrator module 736 will increase or decrease the Vqr voltage command. The hold module 740 may allow the integrator module 736 to operate when operation of the integrator module 736 will result in a reduction of the Vqr voltage command. In this way, the q-axis control module 704 may exit saturation and bring the Vqr voltage command down to a level that can be satisfied by the DC bus voltage.

The d-axis control module 708 may include components similar to the q-axis control module. The d-axis control module 708 includes third and fourth delay modules 750 and 754 that provide delayed versions of the actual Idr to a multiplier module 758. The multiplier module 758 multiplies the actual Idr, the delayed versions of the actual Idr, and the Idr demand, by corresponding d gains 762. The resulting products are added by a summing module 766, and the sum may be limited by a saturation module 770.

An integrator module 774 generates the Vdr voltage command based on a sum of the previous Vdr voltage command and the output from the saturation module 770. A reset signal may reset the integrator modules 736 and 774 to predetermined states, such as at start-up or when an error condition is present. In various implementations, operation of the hold module 740 is applied only to the integrator module 736 and not to the integrator module 774. Suspending operation of both the integrator modules 736 and 774 may lead to undesirable interaction between q-axis and d-axis control.

Figure 8:
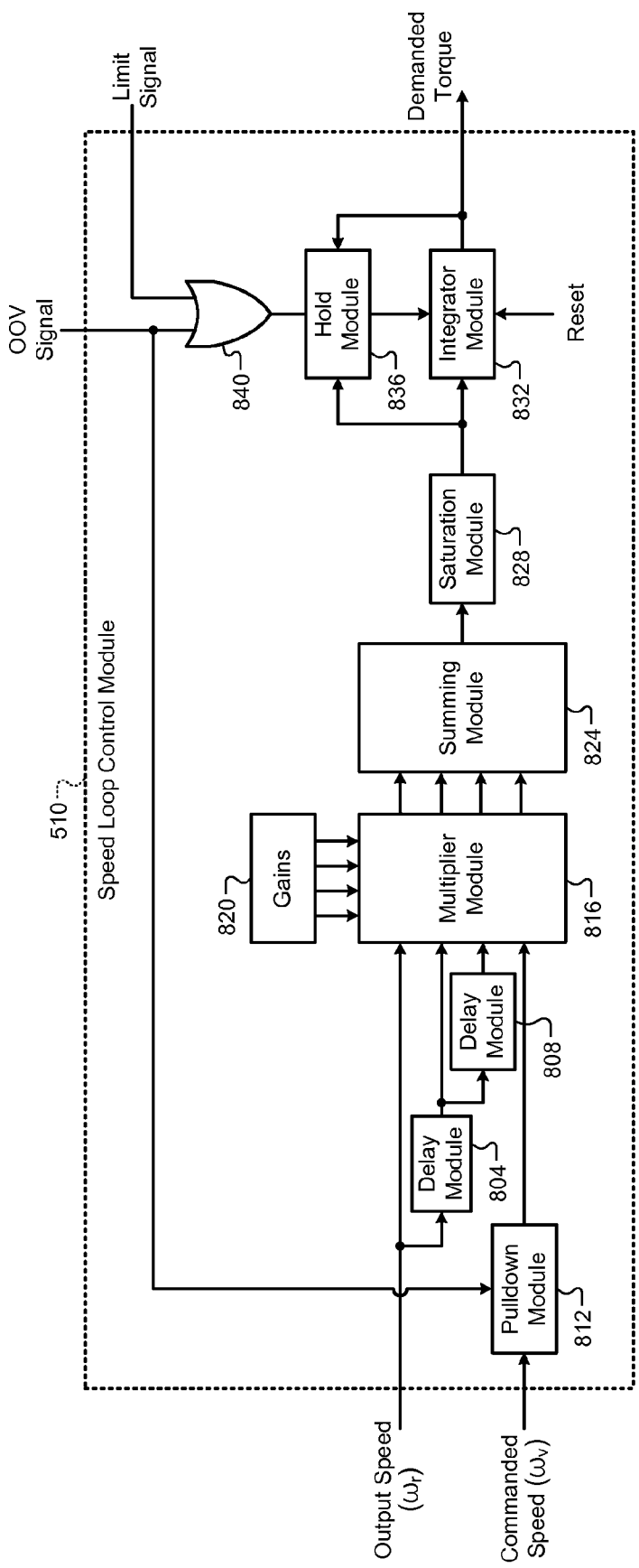
FIG. 8 illustrates a functional block diagram of an example speed loop control module according to the present disclosure.

Referring now to FIG. 8, an example implementation of the speed loop control module 510 is shown. The speed loop control module 510 may also implement a PID control algorithm, where the system state is the output speed $\omega_r$ (i.e., $\omega_{est}$ in closed loop mode) and the system demand is the commanded speed $\omega_v$. First and second delay modules 804 and 808 generate delayed versions of the output speed $\omega_r$.

In various implementations, a pulldown module 812 may be implemented to selectively reduce the commanded speed $\omega_v$ based on the OOV signal. The pulldown module 812 may reduce the commanded speed $\omega_v$ by a product of the OOV amount and a predetermined gain. When the pulldown module 812 is not implemented, the commanded speed $\omega_v$ may be passed directly to a multiplier module 816.

The multiplier module 816 receives the output speed $\omega_r$, delayed versions of $\omega_r$, and the commanding speed $\omega_v$, which may have been reduced by the pulldown module 812. The multiplier module 816 multiplies its inputs by corresponding gains 820 and outputs the products to a summing module 824. The summing module 824 outputs a sum of the products to a saturation module 828.

The saturation module 828 may apply upper and/or lower limits to the sum and outputs the result to an integrator module 832. The integrator module 832 generates the demanded torque based on a sum of the previous value of the demanded torque and the output of the saturation module 828. The integrator module 832 may be reset to a predetermined state by a reset signal.

A hold module 836 may suspend operation of the integrator module 832. In various implementations, the hold module 836 may monitor the input and the output of the integrator module 832 and allow operation of the integrator module 832 when such operation would result in reducing the demanded torque.

The hold module 836 may suspend operation of the integrator module 832 when an OR module 840 indicates that one or both of two conditions is present. The first condition is based on the OOV signal and the second condition is based on the limit signal. In various implementations, the first condition may be the OOV amount being greater than a predetermined threshold, such as 12%. The second condition may be the limit signal from the torque mapping module 514 indicating that the Iqr demand is being limited because of the maximum current limit.

Figure 9:
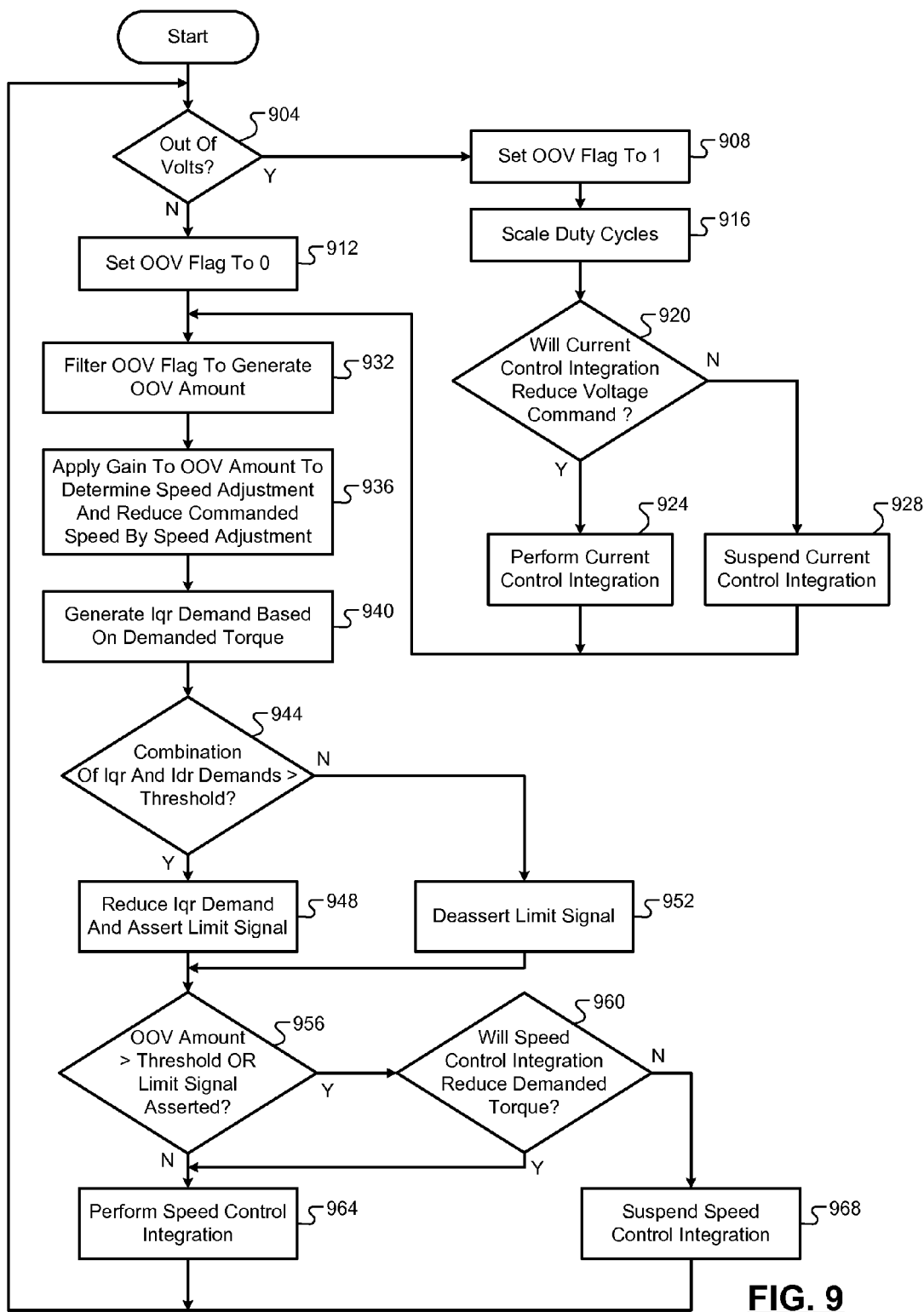
FIG. 9 illustrates a method for controlling operation of an OOV mitigation system according to the present disclosure.

Referring now to FIG. 9, a flowchart depicts exemplary operation of an OOV mitigation system. Control begins at 904, where control determines whether the OOV condition is present. If so, control transfers to 908; otherwise, control transfers to 912. As described above, control may determine that the OOV condition is present when voltage commands cannot be satisfied given the present DC bus voltage.

At 908, control sets the OOV flag to a value of 1 and continues at 916. At 916, control scales the preliminary duty cycle values by a scaling factor in order to reduce the duty cycle values below a predetermined maximum duty cycle.

For purposes of illustration only, the present disclosure has described the duty cycles as being shifted and/or scaled. However, equivalently, the voltage commands themselves may be shifted and/or scaled. For example only, instead of shifting and/or scaling a duty cycle to reduce the duty cycle below a maximum duty cycle, a voltage demand may be shifted and/or scaled to reduce the voltage demand below an available voltage. The available voltage may be equal to the DC bus voltage times the predetermined maximum duty cycle.

Control continues at 920, where control determines whether integration operation in the current control algorithm will reduce a voltage command. If so, control transfers to 924 where the current control integration is performed; otherwise, control transfers to 928, where current control integration is suspended. In either case, control then continues at 932.

At 912, control sets the OOV flag to 0 and continues at 932. At 932, control filters the OOV flag to generate the OOV amount. Control continues at 936, where control applies a gain to the OOV amount to determine a speed adjustment and reduces the commanded speed by the speed adjustment. In various implementations, 936 may be omitted.

Control continues at 940, where control generates an Iqr demand based on a demanded torque. Control continues at 944, where control determines whether a combination of the Iqr demand and an Idr demand is greater than a maximum current threshold. If so, control transfers to 948; otherwise, control transfers to 952. For example only, control may combine the Iqr and Idr demands by adding them or by squaring each of them and adding the squared values.

At 948, control reduces the Iqr demand to meet the maximum current threshold and asserts a limit signal. Control then continues at 956. At 952, control deasserts the limit signal and continues at 956. At 956, control determines whether the OOV amount is greater than a threshold or the limit signal is asserted. If either of these conditions is true, control transfers to 960; otherwise, control transfers to 964.

At 960, control determines whether integral operation of the speed control algorithm will reduce the demanded torque. If so, control transfers to 964, where speed control integration is performed; otherwise, control transfers to 968, where speed control integration is suspended. In either case, control then returns to 904.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A motor control system comprising:
a control module that determines output voltages for operating a motor based on a torque demand;
a switching module that generates switching signals for an inverter that drives the motor,
wherein the switching module generates the switching signals based on the output voltages,
wherein the switching module generates an out-of-volts (OOV) signal according to a comparison based on the output voltages, a maximum duty cycle, and a voltage of a direct current (DC) bus that provides power to the inverter; and
a filtering module that generates an OOV amount by filtering the OOV signal,
wherein the control module selectively limits the torque demand based on the OOV amount.

2. The motor control system of claim 1 further comprising a speed control module that generates the torque demand based on a commanded speed, wherein the speed control module selectively pauses increasing the torque demand based on the OOV amount.

3. The motor control system of claim 2 wherein the speed control module pauses increasing the torque demand when the OOV amount is greater than a predetermined threshold.

4. The motor control system of claim 2 wherein the control module further comprises a torque mapping module that maps the torque demand to a current demand, that selectively limits the current demand based on an upper current limit, and that sets a limit signal while limiting the current demand, wherein the speed control module pauses increasing the torque demand when the limit signal is set.

5. The motor control system of claim 1 further comprising a speed control module that generates the torque demand based on a limited commanded speed, wherein the speed control module generates the limited commanded speed by subtracting a product of a predetermined gain and the OOV amount from a commanded speed.

6. The motor control system of claim 1 wherein the control module further comprises a current control module that generates voltage commands based on the torque demand, wherein the output voltages are calculated based on the voltage commands, and wherein the current control module selectively pauses increasing one of the voltage commands based on the OOV signal.

7. The motor control system of claim 6 wherein the voltage commands include a q-axis voltage command and a d-axis voltage command, and wherein the current control module selectively pauses increasing only the q-axis voltage command based on the OOV signal.

8. The motor control system of claim 1 further comprising a d-axis injection module that adjusts a d-axis current demand based on the OOV amount, wherein the control module determines the output voltages based on a q-axis current demand and the d-axis current demand, and wherein the q-axis current demand is based on the torque demand.

9. The motor control system of claim 1 wherein the switching module generates duty cycle values based on dividing the output voltages by the DC bus voltage and generates the OOV signal based on a comparison of the maximum duty cycle and a maximum difference between two of the duty cycle values.

10. The motor control system of claim 1 wherein the switching module generates the OOV signal based on a comparison of an available voltage and a maximum difference between two of the output voltages, wherein the available voltage is equal to the DC bus voltage multiplied by the maximum duty cycle percentage.

11. A method comprising:
- determining output voltages for operating a motor based on a torque demand;
- generating switching signals, based on the output voltages, for an inverter that drives the motor;
- generating an out-of-volts (OOV) signal according to a comparison based on the output voltages, a maximum duty cycle, and a voltage of a direct current (DC) bus that provides power to the inverter;
- generating an OOV amount by filtering the OOV signal; and
- selectively limiting the torque demand based on the OOV amount.

12. The method of claim 11 further comprising:
- generating the torque demand based on a commanded speed; and
- pausing increasing the torque demand when the OOV amount is greater than a predetermined threshold.

13. The method of claim 12 further comprising:
- mapping the torque demand to a current demand;
- selectively limiting the current demand based on an upper current limit;
- setting a limit signal while limiting the current demand; and
- pausing increasing the torque demand when the limit signal is set.

14. The method of claim 11 further comprising:
- generating a limited commanded speed by subtracting a product of a predetermined gain and the OOV amount from a commanded speed; and
- generating the torque demand based on the limited commanded speed.

15. The method of claim 11 further comprising:
- generating voltage commands based on the torque demand, wherein the output voltages are calculated based on the voltage commands; and
- selectively pausing increasing one of the voltage commands based on the OOV signal.

16. The method of claim 15 wherein the voltage commands include a q-axis voltage command and a d-axis voltage command, and further comprising selectively pausing increasing only the q-axis voltage command based on the OOV signal.

17. The method of claim 11 further comprising:
- determining a q-axis current demand based on the torque demand;
- adjusting a d-axis current demand based on the OOV amount; and
- determining the output voltages based on the q-axis current demand and the d-axis current demand.

18. The method of claim 11 further comprising:
- generating duty cycle values based on dividing the output voltages by the DC bus voltage; and
- generating the OOV signal based on a comparison of the maximum duty cycle and a maximum difference between two of the duty cycle values.

19. The method of claim 11 further comprising:
- determining an available voltage based on the DC bus voltage multiplied by the maximum duty cycle; and
- generating the OOV signal based on a comparison of the available voltage and a maximum difference between two of the output voltages.

20. A method comprising:
- generating a torque demand based on a commanded speed;
- mapping the torque demand to a q-axis current demand;
- selectively limiting the q-axis current demand based on an upper current limit and a d-axis current demand;
- setting a limit signal while limiting the q-axis current demand;
- generating a q-axis voltage command and a d-axis voltage command based on the q-axis current demand and the d-axis current demand, respectively;
- determining first, second, and third output voltages for operating first, second, and third windings, respectively, of a motor based on the voltage commands;
- determining first, second, and third duty cycle values based on dividing the first, second, and third output voltages, respectively, by a voltage of a direct current (DC) bus, wherein the DC bus provides power to an inverter that drives the motor;
- generating switching signals, based on the duty cycle values, for the inverter;
- setting an out-of-volts (OOV) signal to one when at least one of the duty cycle values is greater than a maximum duty cycle, and setting the OOV signal to zero otherwise;
- generating an OOV amount based on a weighted moving average of the OOV signal;
- pausing increasing the torque demand when the OOV amount is greater than a predetermined threshold;
- pausing increasing the torque demand when the limit signal is set;
- adjusting the d-axis current demand based on the OOV amount; and
- pausing increasing only the q-axis voltage command when the OOV signal is set to one.

* * * * *

UNITED STATES PATENT AND TRADEMARK OFFICE
CERTIFICATE OF CORRECTION

PATENT NO. : 8,493,014 B2
APPLICATION NO. : 12/852961
DATED : July 23, 2013
INVENTOR(S) : Michael I. Henderson et al.

It is certified that error appears in the above-identified patent and that said Letters Patent is hereby corrected as shown below:

Title Page, under Item (56),

| | |
|---|---|
| Page 2, Column 2, Other Publications, Line 16 | Delete "Seach" and insert --Search--. |
| Page 3, Column 1, Other Publications, Line 2 | After "PCT/US2010/044998,", insert --mailed--. |
| Page 3, Column 1, Other Publications, Line 17 | Delete "Interieved" and insert --Interleaved--. |
| Page 3, Column 2, Other Publications, Line 7 | Delete "J.E.," and insert --J. E.,--. |
| Page 3, Column 2, Other Publications, Line 9 | Delete "627-633,2002." and insert --627-633, 2002.--. |
| Page 3, Column 2, Other Publications, Line 9 | Delete "10.1109/INTLEC" and insert --10.11.09/INTELEC--. |
| Page 3, Column 2, Other Publications, Line 16 | Delete "al." and insert --al.,--. |
| Page 3, Column 2, Other Publications, Line 24 | Delete "Y.S." and insert --Y. S.--. |

In the Specification

| | |
|---|---|
| Column 4, Line 29 | After "logical", delete "or" and insert --OR--. |
| Column 10, Line 5 | Delete "resisters" and insert --resistors--. |
| Column 10, Line 13 | Delete "degrees)" and insert --degrees--. |
| Column 10, Line 52 | Delete "388" and insert --386--. |
| Column 10, Line 52 | Delete "389" and insert --385--. |
| Column 12, Line 25 | Delete "488" and insert --486--. |
| Column 12, Line 25 | Delete "489" and insert --485--. |

Signed and Sealed this
Thirty-first Day of December, 2013

Margaret A. Focarino
*Commissioner for Patents of the United States Patent and Trademark Office*